US007940790B2

(12) United States Patent
Becker et al.

(10) Patent No.: US 7,940,790 B2
(45) Date of Patent: May 10, 2011

(54) MULTIPLE REQUEST INTERVALS

(75) Inventors: Donald W. Becker, Rancho Santa Fe, CA (US); David Irvine, Carlsbad, CA (US)

(73) Assignee: ViaSat, Inc., Carlsbad, CA (US)

( * ) Notice: Subject to any disclaimer, the term of this patent is extended or adjusted under 35 U.S.C. 154(b) by 322 days.

(21) Appl. No.: 12/134,868

(22) Filed: Jun. 6, 2008

(65) Prior Publication Data

US 2008/0304506 A1    Dec. 11, 2008

Related U.S. Application Data

(60) Provisional application No. 60/943,155, filed on Jun. 11, 2007.

(51) Int. Cl.
*H04L 12/28* (2006.01)
(52) U.S. Cl. .................. 370/462; 370/203
(58) Field of Classification Search .......... 370/319–322, 370/431
See application file for complete search history.

(56) References Cited

U.S. PATENT DOCUMENTS

| | | | |
|---|---|---|---|
| 4,774,707 | A | 9/1988 | Raychaudhuri |
| 4,901,307 | A | 2/1990 | Gilhousen et al. |
| 5,172,375 | A | 12/1992 | Kou |
| 5,239,677 | A | 8/1993 | Jasinski |
| 5,465,253 | A | 11/1995 | Rahnema |

(Continued)

FOREIGN PATENT DOCUMENTS

EP    0282028 A1    9/1988

(Continued)

OTHER PUBLICATIONS

"IEEE Standard for Local and Metropolitan Area Networks, Part 16: Air Interface for Fixed Broadband Wireless Access Systems—Amendment 2: Medium Access Control Modifications and Additional Physical Layer Specifications for 2-11 GHz," IEEE Std 802.16a™ Apr. 1, 2003, 318 pages, New York, New York.

(Continued)

*Primary Examiner* — Derrick W Ferris
*Assistant Examiner* — Maharishi Khirodhar
(74) *Attorney, Agent, or Firm* — Kilpatrick Townsend & Stockton LLP

(57) ABSTRACT

Methods and apparatuses are presented for communicating using a shared communication medium. A request is sent over the shared communication medium. The shared communication medium is organized to include a request signal space and a scheduled transmission signal space. The request signal space includes a plurality of request segments each having a different location within the request signal space. The scheduled transmission signal space includes a plurality of scheduled transmission segments each having a different location within the scheduled transmission signal space. The request occupies more than one request segment. Each of the more than one request segments is randomly selected by the first node. An assignment is received assigning the request to a transmission opportunity in the scheduled transmission signal space. The assignment is made in response to detecting at least one of the more than one request segments. A data transmission is sent using the assigned transmission opportunity.

12 Claims, 14 Drawing Sheets

U.S. PATENT DOCUMENTS

| | | |
|---|---|---|
| 5,570,355 A | 10/1996 | Dail et al. |
| 5,592,469 A | 1/1997 | Szabo |
| 5,644,576 A | 7/1997 | Bauchot et al. |
| 5,669,062 A | 9/1997 | Olds et al. |
| 5,737,335 A | 4/1998 | Mizuta et al. |
| 5,859,879 A | 1/1999 | Bolgiano et al. |
| 6,034,967 A | 3/2000 | Citta et al. |
| 6,252,885 B1 | 6/2001 | Yashiro et al. |
| 6,332,006 B1 | 12/2001 | Rydback et al. |
| 6,366,568 B1 | 4/2002 | Bolgiano et al. |
| 6,510,149 B1 | 1/2003 | Amtmann |
| 6,563,808 B1 | 5/2003 | Cox et al. |
| 6,567,661 B2 | 5/2003 | McDonnell et al. |
| 6,584,101 B2 | 6/2003 | Hagglund et al. |
| 6,590,885 B1 | 7/2003 | Jorgensen |
| 6,677,864 B2 | 1/2004 | Khayrallah |
| 6,680,929 B1 | 1/2004 | Lida et al. |
| 6,717,934 B1 | 4/2004 | Kaasila et al. |
| 6,735,217 B1 | 5/2004 | Webber, Jr. et al. |
| 6,738,350 B1 | 5/2004 | Gao et al. |
| 6,760,591 B1 | 7/2004 | Klinger |
| 6,778,515 B2 | 8/2004 | Bolgiano et al. |
| 6,785,251 B2 | 8/2004 | Bolgiano et al. |
| 6,804,207 B2 | 10/2004 | Bolgiano et al. |
| 6,842,444 B2 | 1/2005 | Bolgiano et al. |
| 6,847,626 B1 | 1/2005 | Carneal et al. |
| 6,889,032 B2 | 5/2005 | Dao et al. |
| 6,985,455 B1 | 1/2006 | Heath et al. |
| 6,990,478 B2 | 1/2006 | Loy et al. |
| 7,024,582 B2 | 4/2006 | Loy et al. |
| 7,072,894 B2 | 7/2006 | Loy et al. |
| 7,111,291 B2 | 9/2006 | Loy et al. |
| 7,120,650 B2 | 10/2006 | Loy et al. |
| 7,143,131 B1 | 11/2006 | Soles et al. |
| 7,177,321 B2 | 2/2007 | Bae |
| 7,187,669 B1 | 3/2007 | Lee |
| 7,260,064 B2 | 8/2007 | Basu et al. |
| 7,330,487 B2 | 2/2008 | Chang et al. |
| 7,369,526 B2 | 5/2008 | Lechleider et al. |
| 7,370,116 B2 | 5/2008 | Chan et al. |
| 7,440,404 B2 | 10/2008 | Nagesh et al. |
| 7,450,914 B2 | 11/2008 | Valdivia et al. |
| 7,463,608 B2 | 12/2008 | Bolgiano et al. |
| 7,471,932 B2 | 12/2008 | Wu et al. |
| 7,486,643 B2 | 2/2009 | Czaja et al. |
| 7,515,566 B2 | 4/2009 | Dale et al. |
| 7,529,221 B2 | 5/2009 | Czaja et al. |
| 7,554,964 B2 | 6/2009 | Bolgiano et al. |
| 7,606,531 B2 | 10/2009 | Asai et al. |
| 7,620,010 B2 | 11/2009 | Takeda et al. |
| 7,657,455 B2 | 2/2010 | Sachdev et al. |
| 7,657,628 B1 | 2/2010 | McDysan et al. |
| 7,738,859 B2 | 6/2010 | Roy et al. |
| 7,746,784 B2 | 6/2010 | de Heer |
| 2001/0045494 A1 | 11/2001 | Higgins |
| 2002/0026523 A1 | 2/2002 | Mallory et al. |
| 2002/0077141 A1 | 6/2002 | Hwang et al. |
| 2002/0080816 A1 | 6/2002 | Spinar et al. |
| 2002/0110102 A1 | 8/2002 | Wei et al. |
| 2002/0126711 A1 | 9/2002 | Robinett et al. |
| 2002/0131376 A1 | 9/2002 | Wheatley et al. |
| 2002/0136276 A1 | 9/2002 | Franceschini |
| 2003/0016692 A1 | 1/2003 | Thomas et al. |
| 2003/0083095 A1 | 5/2003 | Liang |
| 2003/0128687 A1* | 7/2003 | Worfolk et al. ............ 370/351 |
| 2003/0147411 A1 | 8/2003 | Goosman |
| 2003/0207684 A1 | 11/2003 | Wesel |
| 2003/0223409 A1 | 12/2003 | Wiebe |
| 2004/0136334 A1* | 7/2004 | Heiman et al. ............ 370/316 |
| 2004/0142658 A1 | 7/2004 | McKenna et al. |
| 2004/0162099 A1 | 8/2004 | Chen et al. |
| 2004/0218577 A1 | 11/2004 | Nguyen |
| 2004/0233867 A1 | 11/2004 | Wheatley |
| 2005/0009529 A1 | 1/2005 | Chen et al. |
| 2005/0021802 A1 | 1/2005 | Chen et al. |
| 2005/0025219 A1 | 2/2005 | Rice |
| 2005/0030931 A1 | 2/2005 | Sung et al. |
| 2005/0058135 A1 | 3/2005 | Sisto et al. |
| 2005/0122999 A1 | 6/2005 | Scherzer et al. |
| 2005/0233710 A1 | 10/2005 | Lakkis et al. |
| 2006/0013181 A1 | 1/2006 | Stolpman et al. |
| 2006/0050664 A1 | 3/2006 | Guey |
| 2006/0110162 A1 | 5/2006 | Tian et al. |
| 2006/0153283 A1 | 7/2006 | Scharf et al. |
| 2007/0004415 A1 | 1/2007 | Abedi |
| 2007/0021117 A1 | 1/2007 | McKenna |
| 2007/0025398 A1 | 2/2007 | Yonge, III et al. |
| 2007/0030834 A1 | 2/2007 | Rappaport |
| 2007/0047499 A1 | 3/2007 | Montojo |
| 2007/0070908 A1 | 3/2007 | Ghosh et al. |
| 2007/0111760 A1 | 5/2007 | Hovers et al. |
| 2007/0189404 A1 | 8/2007 | Baum et al. |
| 2008/0075033 A1 | 3/2008 | Shattil |
| 2008/0076432 A1 | 3/2008 | Senarath et al. |
| 2008/0095121 A1 | 4/2008 | Shattil |
| 2008/0108361 A1 | 5/2008 | Ylanen et al. |
| 2008/0146177 A1 | 6/2008 | Hwang et al. |
| 2008/0186855 A1 | 8/2008 | Becker |
| 2008/0186856 A1 | 8/2008 | Becker |
| 2008/0186857 A1 | 8/2008 | Becker |
| 2008/0186859 A1 | 8/2008 | Becker |
| 2008/0186860 A1 | 8/2008 | Becker |
| 2008/0186861 A1 | 8/2008 | Becker |
| 2008/0186940 A1 | 8/2008 | Becker |
| 2008/0186975 A1 | 8/2008 | Becker |
| 2008/0186994 A1 | 8/2008 | Becker |
| 2008/0186997 A1 | 8/2008 | Becker |
| 2008/0187002 A1 | 8/2008 | Becker |
| 2008/0187003 A1 | 8/2008 | Becker |
| 2008/0212524 A1 | 9/2008 | Niwano |
| 2008/0219211 A1 | 9/2008 | Franceschini |
| 2008/0219220 A1 | 9/2008 | Gerakoulis |
| 2008/0304507 A1 | 12/2008 | Irvine |
| 2009/0080375 A1 | 3/2009 | Jalil et al. |
| 2009/0129334 A1 | 5/2009 | Ma et al. |
| 2009/0141680 A1 | 6/2009 | Becker |
| 2009/0141736 A1 | 6/2009 | Becker |

FOREIGN PATENT DOCUMENTS

| | | |
|---|---|---|
| EP | 0680168 A | 11/1995 |
| EP | 0917317 A | 5/1999 |
| EP | 1526655 A3 | 4/2005 |
| EP | 1 909 526 A | 4/2008 |
| JP | 2003-169164 A | 6/2003 |
| WO | WO 93/15573 A | 8/1993 |
| WO | WO 2004/054221 A1 | 6/2004 |
| WO | WO 2004/055249 A2 | 5/2007 |

OTHER PUBLICATIONS

"IEEE Standard for Local and Metropolitan Area Networks, Part 16: Air Interface for Fixed Broadband Wireless Access Systems," IEEE, May 29, 2009; 864 pages, New York, New York.

"IEEE Standard for Local and Metropolitan Area Networks, Part 16: Air Interface for Fixed Broadband Wireless Access Systems, Amendment 2: Physical and Medium Access Control Layers for Combined Fixed and Mobile Operation in Licensed Bands and Corrigendum 1," IEEE, Feb. 28, 2006, 864 pages, New York, New York.

Non-Final Office Action for U.S. Appl. No. 11/771,762 mailed on Oct. 16, 2009; 21 pages.

Non-Final Office Action for U.S. Appl. No. 11/771,840 mailed on Oct. 22, 2009; 22 pages.

Notice of Allowance for U.S. Appl. No. 11/771,856 mailed on Dec. 15, 2009; 4 pages.

Notice of Allowance for U.S. Appl. No. 11/771,870 mailed on Dec. 23, 2009; 4 pages.

Final Office Action for U.S. Appl. No. 11/771,882 mailed on Dec. 8, 2009; 30 pages.

Final Office Action for U.S. Appl. No. 11/771,894 mailed on Jan. 12, 2010; 36 pages.

Final Office Action for U.S. Appl. No. 11/771,903 mailed on Jan. 5, 2010; 33 pages.

Final Office Action for U.S. Appl. No. 11/771,910 mailed on Dec. 8, 2009; 19 pages.

Non-Final Office Action for U.S. Appl. No. 11/771,926 mailed on Nov. 27, 2009; 29 pages.
Chan M.C. B. et al "A Dynamic Reservation Protocol for LEO Mobile Satellite Systems" IEEE Journal on Selected Areas in Communications, Apr. 1, 2004, pp. 559-573, vol. 22, No. 3.
Ghosh et al; "Random Access Design for UMTS Air-Interface Evolution;" IEEE 65$^{th}$ Vehicular Technology Conference; pp. 1041-1045; Apr. 1, 2007.
Haberle H. et al, "G2-Combinations of Frequency, Time and Space Division Multiple Access in Multitransponder Satellite Communications"; pp. 432-440, Nov. 1, 1972.
Hideto et al, "A Wavelet Packet Modulation Method for Satellite Communications," Nov. 1, 2005 pp. 1-5.
"Orthonogal Pilot Channel Structure in E-UTRA Uplink;" TSG-RAN AD HOC LTE; Jan. 25, 2006; pp. 1-8; Section 2-4.
"Random Access Burst Design for E-UTRA;" Panasonic, NTT DoCoMO; TSG-RAW WG1 Meeting #46; Aug. 28, 2006; pp. 1-9; Section 2-3; Tallinn, Estonia.
Tallal O; "Mac Architecture for Broadband satellite access system" Apr. 20, 2000 at URL http///users.encs.concordia.ca/{tahar/theses/Tallal-Thesis.pdf,.
PCT Written Opinion of the International Searching Authority for Application No. PCT/US/2008/053199; mailed Jul. 18, 2008; pp. 11.
PCT Search Report of the International Searching Authority for Application No. PCT/US/2008/053199 mailed on Jul. 18, 2008 pp. 4.
PCT Written Opinion of the International Searching Authority for Application No. PCT/US/2008/053200; mailed Jul. 18, 2008; pp. 10.
PCT Search Report of the International Searching Authority for Application No. PCT/US/2008/053200; mailed on Jul. 18, 2008 pp. 4.
PCT Search Report of the International Searching Authority for Application No. PCT/US/2008/053205; mailed on Jul. 18, 2008; pp. 4.
PCT Written Opinion of the International Searching Authority for Application No. PCT/US2008/053205; mailed Jul. 18, 2008; pp. 10.
PCT Search Report of the International Searching Authority for Application No. PCT/US/2008/053208; mailed on Jul. 18, 2008; pp. 4.
PCT Written Opinion of the International Searching Authority for Application No. PCT/US/2008/053208; mailed Jul. 18, 2008; pp. 10.
PCT Written Opinion of the International Searching Authority for Application No. PC/US/2008/053210; mailed on Sep. 15, 2008; pp. 9.
PCT Search Report of the International Searching Authority for Application No. PCT/US/2008/053210; mailed on Sep. 15, 2008 pp. 6.
PCT Search Report of the International Searching Authority for Application No. PCT/US/2008/066360; mailed on Jun. 9, 2008; pp. 3.
PCT Written Opinion of the International Searching Authority for Application No. PCT/US/2008/066360; mailed on Jun. 9, 2008; pp. 8.
PCT Written Opinion of the International Searching Authority for Application No. PCT/US/2008/066361; mailed on Jun. 9, 2008; pp. 7.
PCT Search Report of the International Searching Authority for Application No. PCT/US/2008/57672; mailed on Jun. 23, 2008; pp. 7.
PCT Written Opinion of the International Searching Authority for Application No. PCT/US/2008/57672; mailed on Jun. 23, 2008 pp. 3.
PCT Search Report of the International Searching Authority for Application No. PCT/US/2008/084574; mailed on Jan. 28, 2009; pp. 2.
PCT Written Opinion of the International Searching Authority for Application No. PCT/ US/2008/084574; mailed on Jan. 28, pp. 7.
PCT Search Report of the International Searching Authority for Application No. PCT/US/2008/084577; mailed on Feb. 5, 2009; pp. 2.
PCT Written Opinion of the International Searching Authority for Application No. PCT/US/2008/084577; mailed on Feb. 5, 2009; pp. 7.
Non-Final Office Action for U.S. Appl. No. 11/771,910; mailed on Jun. 18, 2009; pp. 17.
Non-Final Office Action for U.S. Appl. No. 11/771,882; mailed on Jun. 22, 2009; pp. 22.
Non-Final Office Action for U.S. Appl. No. 11/771,856; mailed on Jul. 8, 2009; pp. 7.
Non-Final Office Action for U.S. Appl. No. 11/771,870; mailed on Jul. 8, 2009; pp. 10.
Non-Final Office Action for U.S. Appl. No. 11/771,810; mailed on Jul. 21, 2009; pp. 18.
Non-Final Office Action for U.S. Appl. No. 11/771,828; mailed on Jul. 23, 2009; pp. 21.
Final Office Action for U.S. Appl. No. 11/771,762 mailed on Feb. 5, 2010; 20 pages.
Final Office Action for U.S. Appl. No. 11/771,798 mailed on Jan. 25, 2010; 33 pages.
Final Office Action for U.S. Appl. No. 11/771,810 mailed on Jan. 27, 2010; 30 pages.
Final Office Action for U.S. Appl. No. 11/771,828 mailed on Jan. 22, 2010; 35 page.
Supplemental Notice of Allowability for U.S. Appl. No. 11/771,856 mailed on Feb. 12, 2010; 6 pages.
Supplemental Notice of Allowability for U.S. Appl. No. 11/771,856 mailed on Mar. 10, 2010; 2 pages.
Supplemental Notice of Allowability for U.S. Appl. No. 11/771,870 mailed on Feb. 12, 2010; 4 pages.
Supplemental Notice of Allowability for U.S. Appl. No. 11/771,870 mailed on Mar. 10, 2010; 2 pages.
Advisory Action for U.S. Appl. No. 11/771,882 mailed on Mar. 22, 2010; 5 pages.
Advisory Action for U.S. Appl. No. 11/771,903 mailed on Mar. 11, 2010; 3 pages.
Advisory Action for U.S. Appl. No. 11/771,910 mailed on Mar. 8, 2010; 5 pages.
International Preliminary Report on Patentability for PCT Application No. PCT/US2008/066360 mailed on Dec. 23, 2009; 8 pages.
International Preliminary Report on Patentability for PCT Application No. PCT/US2008/066361 mailed on Dec. 23, 2009; 7 pages.
Asgarkhani et al., "Simulation studies of mixed traffic on satellite channels using TDMA-reservation protocol," Proceeding of the International Phoenix Conference on Computers and Communications, Scottsdale, AZ, Mar. 22-24, 1989; [Proceedings of the Annual International Phoenix Conference on Computers and Communications], Washington, IEEE Comp. Soc. Pres. (Mar. 22, 1989) pp. 195-200.
Chitre et al., "Random access with notification—A new multiple-access scheme for VSAT networks," Comsat Technical Review, Communications Satellite Corporation, Washington US (Mar. 21, 1989) vol. 19, No. 1, pp. 99-121.
International Search Report PCT/US2008/066361 dated Sep. 23, 2008.
Advisory Action for U.S. Appl. No. 11/771,798 mailed on Apr. 13, 2010; 3 pages.
Advisory Action for U.S. Appl. No. 11/771,810 mailed on Apr. 15, 2010; 3 pages.
Advisory Action for U.S. Appl. No. 11/771,828 mailed on Apr. 9, 2010; 3 pages.
Non-Final Office Action for U.S. Appl. No. 11/771,828 mailed on May 24, 2010; 24 pages.
Notice of Allowance for U.S. Appl. No. 11/771,840 mailed on Apr. 19, 2010 ; 16 pages.
Advisory Action for U.S. Appl. No. 11/771,894 mailed on Apr. 1, 2010; 3 pages.
Final Office Action for U.S. Appl. No. 11/771,926 mailed May 19, 2010; 18 pages.
"Distributed Bandwith Request and Allocation in Multi-Hop Relay" IEEE 802.16 Broadband Wireless Access Working Group; Jan. 8, 2007; 8 pages.
Non-Final Office Action for U.S. Appl. No. 11/771,894; mailed on Jul. 23, 2009; 26 pages.
Non-Final Office Action for U.S. Appl. No. 11/771,798 mailed on Jul. 24, 2009; 22 pages.
Non-Final Office Action for U.S. Appl. No. 11/771,903 mailed on Jul. 31, 2009; 24 pages.

Kawamura et al., Orthogonal Pilot Channel Using Combination of FDMA and CDMA in Single-Carrier FDMA-Based Evolved UTRA Uplink, IEEE, Mar. 11-15, 2007, 2405-2410.

Final Office Action for U.S. Appl. No. 11/771,828 mailed on Sep. 8, 2010; 11 pages.

Notice of Allowance for U.S. Appl. No. 11/771,926 mailed on Aug. 9, 2010; 17 pages.

Non-Final Office Action for U.S. Appl. No. 12/134,637 mailed on Jul. 12, 2010; 31 pages.

Non-Final Office Action for U.S. Appl. No. 11/771,910 mailed on Dec. 1, 2010; 23 pages.

Supplemental Notice of Allowability for U.S. Appl. No. 11/771,926 mailed on Sep. 17, 2010; 15 pages.

Non-Final Office Action for U.S. Appl. No. 12/276,148 mailed on Oct. 5, 2010; 34 pages.

Advisory Action for U.S. Appl. No. 11/771,828 mailed on Nov. 22, 2010; 3 pages.

* cited by examiner

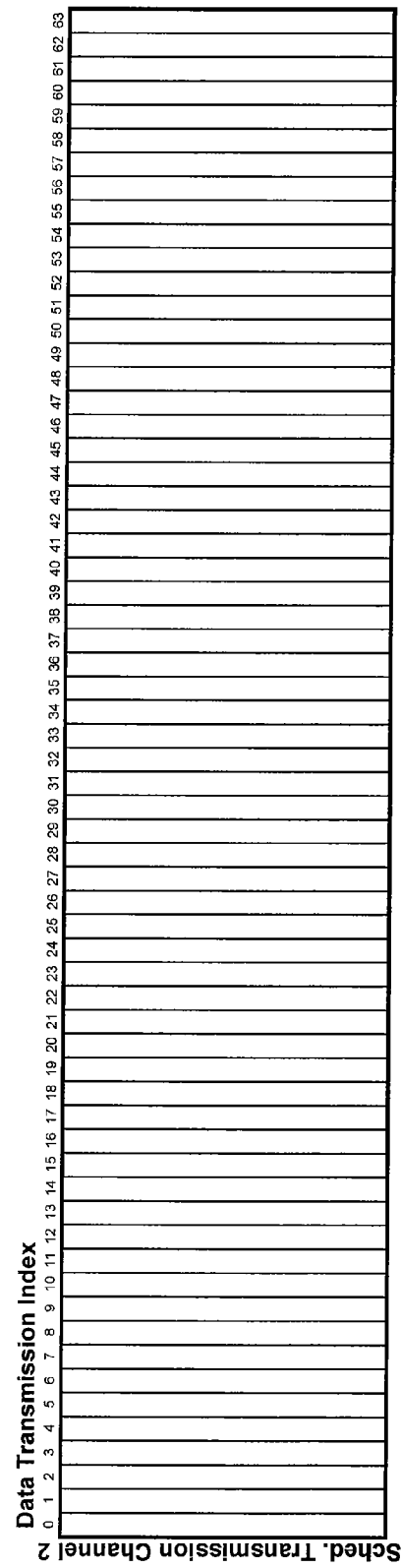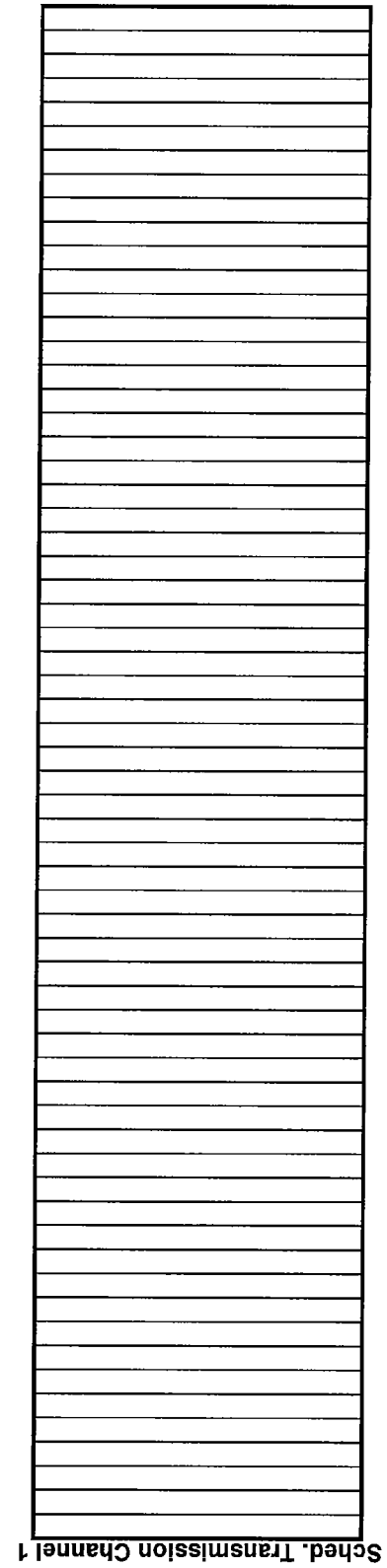
FIG. 7

MULTIPLE REQUEST INTERVALS

CROSS-REFERENCES TO RELATED APPLICATIONS

The present application claims benefit of priority under 35 U.S.C. 119(e) of U.S. provisional Application No. 60/943,155, filed on Jun. 11, 2007, entitled "Linked Orthogonal Reservation Request Codes," Client Reference No. VS-0267-US, the content of which is incorporated herein by reference in its entirety.

BACKGROUND OF THE INVENTION

In many applications, a communication medium is shared among a number of nodes. The nodes compete with one another for access to the shared communication medium. At any given moment, there may be more than one of the nodes that wish to transmit data over the shared communication medium. A system is typically put in place to facilitate access to the shared communication medium by the various nodes. Various categories of such multiple access systems have been developed.

One category of multiple access systems utilizes contention protocols. Examples of these contention protocols include the ALOHA protocol and the slotted ALOHA protocol, which are known in the art. Here, each node is allowed to freely transmit its data over the shared communication medium at any time or any slotted time. In a system employing a hub, each node sends its transmission to the hub, which then broadcasts the transmission to all nodes. In a system without a hub, each node directly broadcasts its transmission to all nodes. In either case, every node listens to the channel for its own transmission and attempts to receive it. If a node is unsuccessful in receiving its own transmission, the node can assume that its transmission was involved in a collision with another transmission, and the node simply re-transmits its data after waiting a random amount of time. In this manner, collisions are allowed to occur but are resolved by the nodes.

Another category of multiple access systems utilizes carrier sense protocols. Examples include persistent carrier sense multiple access (persistent CSMA) and non-persistent carrier sense multiple access (non-persistent CSMA) protocols, which are known in the art. Generally speaking, these protocols require each node to listen to the shared communication medium before transmitting. Only if the shared communication medium is available is the node allowed to transmit its data. In persistent CSMA, when a node senses that the shared communication medium is not available, the node continually listens to the shared communication medium and attempts to transmit as soon as the medium becomes available. In non-persistent CSMA, when a node senses that the shared communication medium is not available, the node waits an amount of time before attempting to listen to the shared communication channel for an opportunity to transmit. Even though a node listens first before transmitting, there still exists a probability for collisions. This is because when the medium is available, two or more nodes can detect the availability and decide that they are going to transmit data. Various techniques have been developed to handle such collisions.

Yet another category of multiple access systems utilizes contention free protocols. Here, each node can reserve the shared communication medium in order to transmit data. The node can transmit data without colliding with transmissions from other nodes. This is because the shared communication medium is reserved, for a particular time duration for example, for the node's transmission and not for any other transmission. A significant advantage of contention free protocols is that the communication medium is not taken up by unsuccessful transmissions that collide with one another and the resulting re-transmission attempts. This can lead to a more efficient use of the shared communication medium, especially as the number of nodes and number of data transmissions increase.

However, contention free protocols require a reservation process that allows nodes to reserve use of the shared communication medium. Making such reservations also requires communications, which are also susceptible to collisions. Collisions within the reservation process can lead to collisions during subsequent data transmission. Thus, to take full advantage of the benefits of contention free access, more efficient systems for reservation of the shared communication medium are needed.

BRIEF SUMMARY OF THE INVENTION

The present invention relates to methods and apparatuses for communicating using a shared communication medium. A request is sent from a first node in a plurality of nodes over the shared communication medium. The shared communication medium is organized to include a request signal space and a scheduled transmission signal space. The request signal space includes a plurality of request segments each having a different location within the request signal space. The scheduled transmission signal space includes a plurality of scheduled transmission segments each having a different location within the scheduled transmission signal space. The request occupies more than one request segment from the plurality of request segments. Each of the more than one request segments is randomly selected by the first node. An assignment is received for assigning the request to a transmission opportunity in the scheduled transmission signal space. The assignment is made in response to detecting at least one of the more than one request segments. From the first node, a data transmission is sent using the assigned transmission opportunity in the scheduled transmission signal space.

The request signal space may comprise a plurality of request intervals with the plurality of request segments organized within the plurality of request intervals. Each of the more than one request segments is selected from a different one of the plurality of request intervals.

The plurality of request intervals may be organized based on an expected loading of the shared communication medium.

The plurality of request intervals and the plurality of request segments may be organized based on a collision probability of the request.

The request signal space may be organized based on code division multiplexing, where each of the more than one request segments is randomly selected by selecting a code word.

The present invention further relates to methods and apparatuses for communicating using a shared communication medium involving a plurality of nodes including a first node and a second node. At the second node, a request is received from the first node over the shared communication medium. The shared communication medium is organized to include a request signal space and a scheduled transmission signal space. The request signal space includes a plurality of request segments each having a different location within the request signal space. The scheduled transmission signal space includes a plurality of scheduled transmission segments each having a different location within the scheduled transmission signal space. The request occupies more than one request segment from the plurality of request segments. Each of the more than one request segments is randomly selected by the first node. At the second node, an assignment is sent for assigning the request to a transmission opportunity in the scheduled transmission signal space. The assignment is made in response to detecting at least one of the more than one request segments. At the second node, a data transmission is received that uses the assigned transmission opportunity in the scheduled transmission signal space.

BRIEF DESCRIPTION OF THE DRAWINGS

FIG. 7 is an illustrative signal diagram showing frequency division multiplexing as utilized to partition the request signal space and the scheduled transmission signal space, with frequency division multiplexing/time division multiplexing request segments and scheduled transmission segments.

DETAILED DESCRIPTION OF THE INVENTION

The present invention relates to communications conducted over a shared communications medium involving a plurality of nodes. The invention is specifically related to techniques employed for requesting opportunities for scheduled transmissions.

Figure 1:
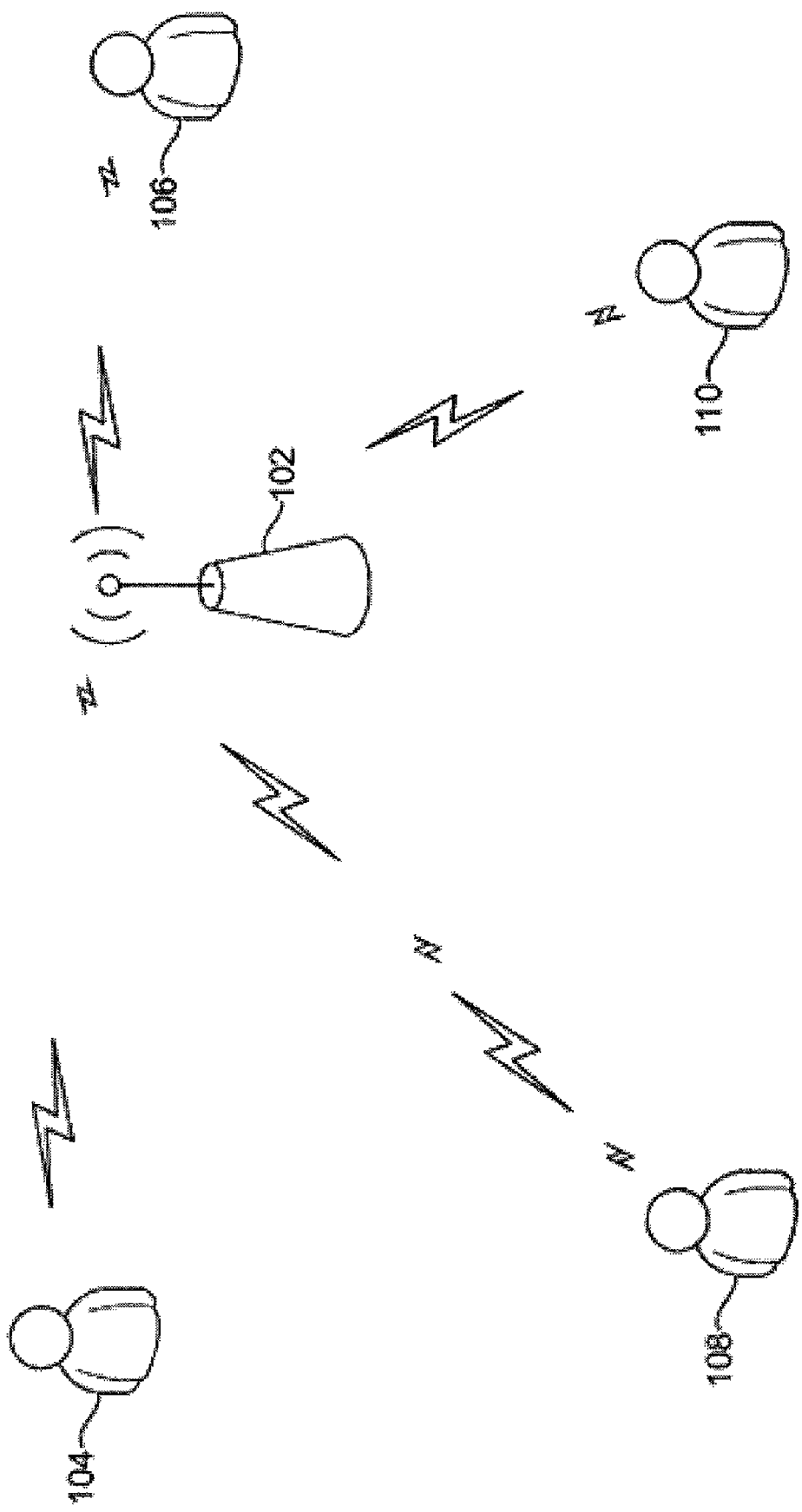
FIG. 1 presents a simplified network including a scheduler node 102 and a plurality of access nodes 104, 106, 108, and 110 utilizing a shared communication medium.

FIG. 1 presents a simplified network including a scheduler node 102 and a plurality of access nodes 104, 106, 108, and 110 utilizing a shared communication medium. This configuration corresponds to a mode of operation referred to here as "scheduler mode," which is described as an illustrative example.

Referring to FIG. 1, scheduler node 102 serves to control usage of the shared communication medium by access nodes 104, 106, 108, and 110. The shared communication medium can represent any communication medium that may be utilized by more than one node. For example, the shared communication medium can represent signal space in one or more satellite channels. Thus, the access nodes and the scheduler node may be part of a satellite network. As another example, the shared communication medium can represent signal space in one or more wireless terrestrial channels. Thus, the access nodes and the scheduler node may be part of a terrestrial wireless network. As yet another example, the shared communication medium can represent signal space in one or more wired channels. Thus, the access nodes and scheduler node may be part of a wired network.

Furthermore, embodiments of the present invention may be implemented in different network topologies that involve a shared communication medium. These may include star topologies, mesh topologies, bus topologies, and others.

Scheduler node 102 provides control over access to the shared communication medium by access nodes 104, 106, 108, and 110. In order to transmit data over the shared communication medium, an access node, such as access nodes 104, 106, 108, and 110, first sends a request to scheduler node 102. In response, scheduler node 102 assigns an opportunity for data transmission to the access node. Scheduler node 102 sends an assignment message associated with the assignment to the access nodes. Upon receiving the assignment, the access node that made the request can transmit data in the assigned transmission opportunity. This general scheme of request, assignment, and transmission is used in various embodiments of the invention. However, other embodiments of the invention may involve variations and different operations.

Figure 2:
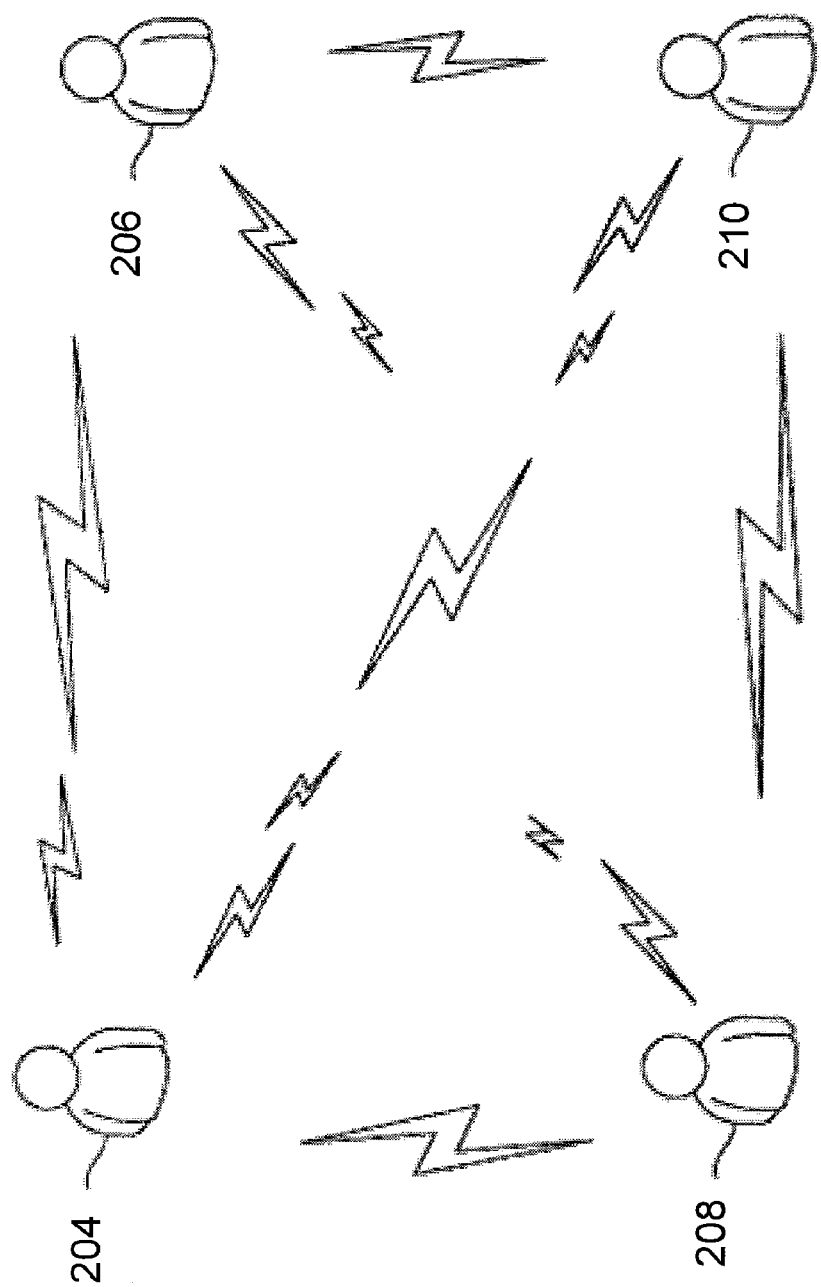
FIG. 2 presents a simplified network operating under a "no scheduler mode."

For example, FIG. 2 presents a simplified network operating under a "no scheduler mode." A plurality of access nodes 204, 206, 208, and 210 are shown that utilize a shared communication medium. Instead of depending on a scheduler node to receive requests and determine the proper assignment of scheduled transmission segments, each access node 204, 206, 208, and 210 independently determines the proper assignment of scheduled transmission segments. Here, it is assumed that all access nodes follow the same rules for determining assignments, and all access nodes can detect all requests. If this is the case, then the same assignment of scheduled transmission segments would be generated at each access node. That is, each access node would independently generate the same assignment. As such, there would be no need for a dedicated scheduler node. Also, there would be no need for assignment messages to be sent. Each access node would be able to locally determine the proper assignment on its own. Consequently, a feedback signal space may not need to be provided for sending any assignment messages.

A network may also operate under a "hybrid mode," which is described below. Referring back to FIG. 1, under a hybrid mode, each access node, such as access nodes 104, 106, 108, and 110, receives both (1) assignment messages from a scheduler node such as 102 and (2) requests from the other access nodes. Here, each access node independently determines the proper assignment of scheduled transmission segments based on requests received from other nodes. However, in making the determination, the access node also takes into account the assignment messages received from the scheduler node. By utilizing both sources of information, each access node can make a more robust determination regarding the proper assignment of scheduled transmission segments.

Alternatively, a system may contain a mixture of access nodes operating under different assignment modes. Some of the access nodes in the system may operate under a "scheduler mode." Some of the access nodes in the system may operate under a "no scheduler mode." Finally, some of the access nodes in the system may operate under a "hybrid mode."

Symbols

Generally speaking, a basic unit of data transmission is referred to here as a "symbol." A symbol can be defined to have one out of a number of possible values. For example, a binary symbol may have one of two possible values, such as "0" and "1." Thus, a sequence of N binary symbols may convey $2^N$ possible messages. More generally speaking, an M-ary symbol may have M possible values. Thus, a sequence of N M-ary symbols may convey $M^N$ possible messages.

The concept of symbol and the methods by which a symbol can assume values is quite general. In many applications, a symbol is associated with a defined baseband pulse shape which is up-converted to a carrier frequency with a particular phase relationship to the carrier and with a particular amplitude. The amplitude and/or phase of the symbol is known as the modulation and carries the information of a symbol. The set of permissible modulation points defined in the amplitude and phase plane is known as the modulation constellation. The amount of information that a symbol may convey is related to the number of discrete points of the constellation. 16-QAM is an example of an amplitude-phase constellation which allows transmission of up to 4 bits of information per symbol. In some applications, only the phase is used for modulation. Quadra-phase shift keying (QPSK) is an example of pure phase modulation which allows transmission of up to 2 bits of information per symbol. In other applications, the symbol waveform may be defined such that symbol phase may either not exist or be difficult to receive accurately, in which case pure amplitude modulation can be used. One example of binary amplitude modulation is on-off amplitude-shift keying modulation which allows transmission of up to 1 bit of information per symbol.

Each symbol may occupy a particular portion of the relevant signal space. Specifically, each symbol may be said to occupy a certain amount of "time-bandwidth product." Here, an amount of time-bandwidth product is a scalar quantity that may be measured in units of Hz-seconds and does not necessarily dictate how the signal is distributed within the signal space. In theory, symbols cannot be strictly limited in both time and frequency. It is customary, however, to define the time-bandwidth product of a signal to be the time-bandwidth product of the region in which the preponderance of signal energy resides. Since precise definitions of time-bandwidth product vary somewhat throughout the literature, figures showing symbol boundaries in time-frequency space should only be considered as approximate representations.

Just as a simple example, a signal spanning a bandwidth of 1 Hz and lasting a duration of 1 second may have a time-bandwidth product of 1 Hz-second. A signal spanning a bandwidth of 0.5 Hz and lasting a duration of 2 seconds may also have a time-bandwidth product of 1 Hz-second. Similarly, a signal spanning a bandwidth of 0.1 Hz and lasting a duration of 10 seconds may also have a time-bandwidth product of 1 Hz-second. These examples do not assume any multiplexing of the signal space, which is discussed separately below. Also, the particular values used in these and other examples described herein are for illustrative purpose only. Different values may be used in actual systems.

The measurement of a symbol in terms of an amount of time-bandwidth product is also applicable when different signal space multiplexing techniques are employed. Such techniques may include time-division multiplexing, frequency-division multiplexing, wavelet-division multiplexing, code-division multiplexing, and/or others. In each of the following four examples, a symbol occupies a time-bandwidth product of 1 Hz-second, even though different signal space multiplexing techniques are used.

Figure 3:
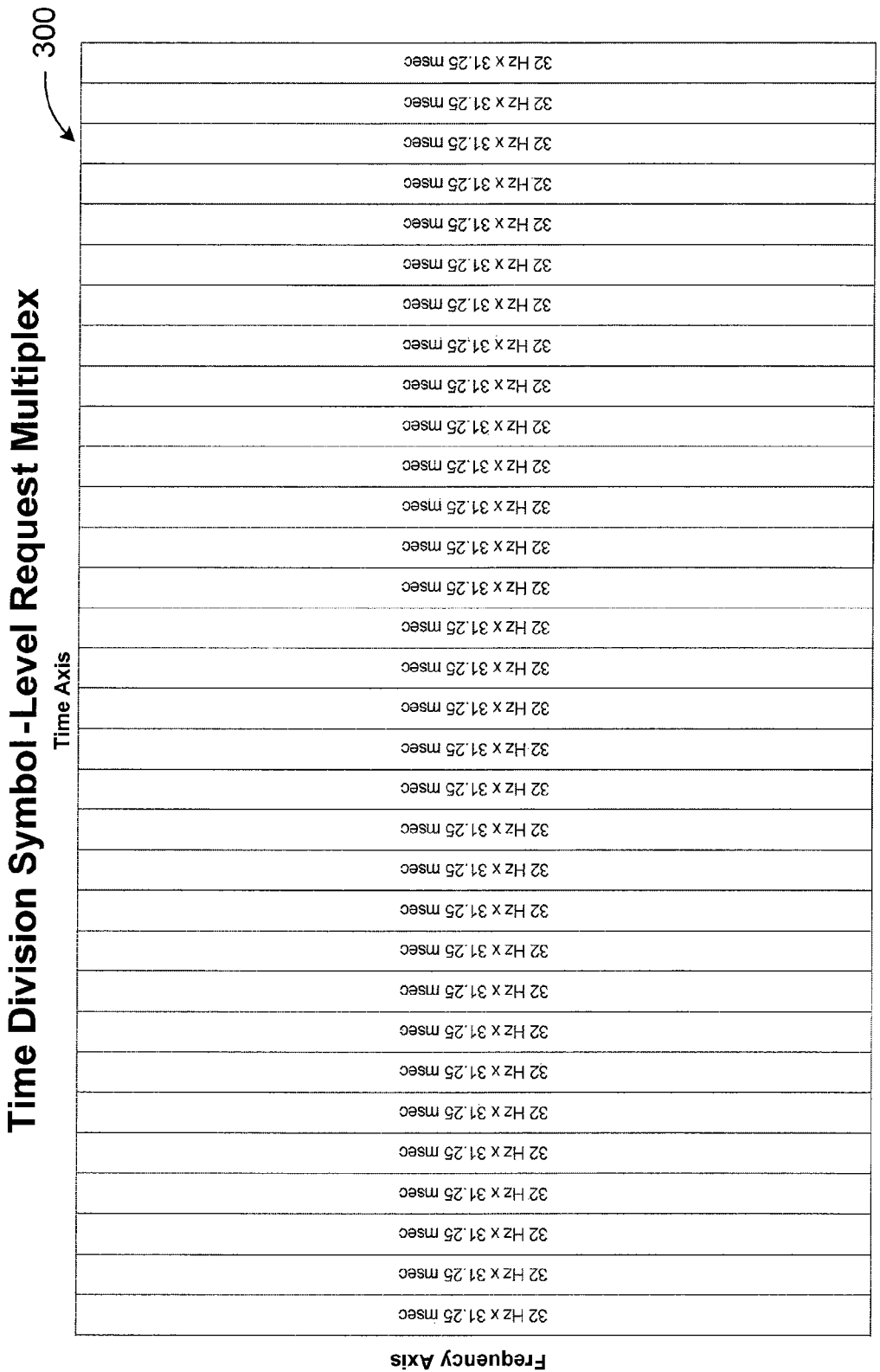
FIG. 3 depicts a time division multiplexing scheme as applied to a frequency channel having a bandwidth of 32 Hz over a duration of 1 second.

In a first example, FIG. 3 depicts a time division multiplexing scheme 300 as applied to a frequency channel having a bandwidth of 32 Hz over a duration of 1 second. The channel is divided into 32 time slots, each having a duration of 1/32 second. A symbol may be transmitted in each 1/32-second time slot over the bandwidth of 32 Hz. In this example, each symbol has a time-bandwidth product of 1 Hz-second.

Figure 4:
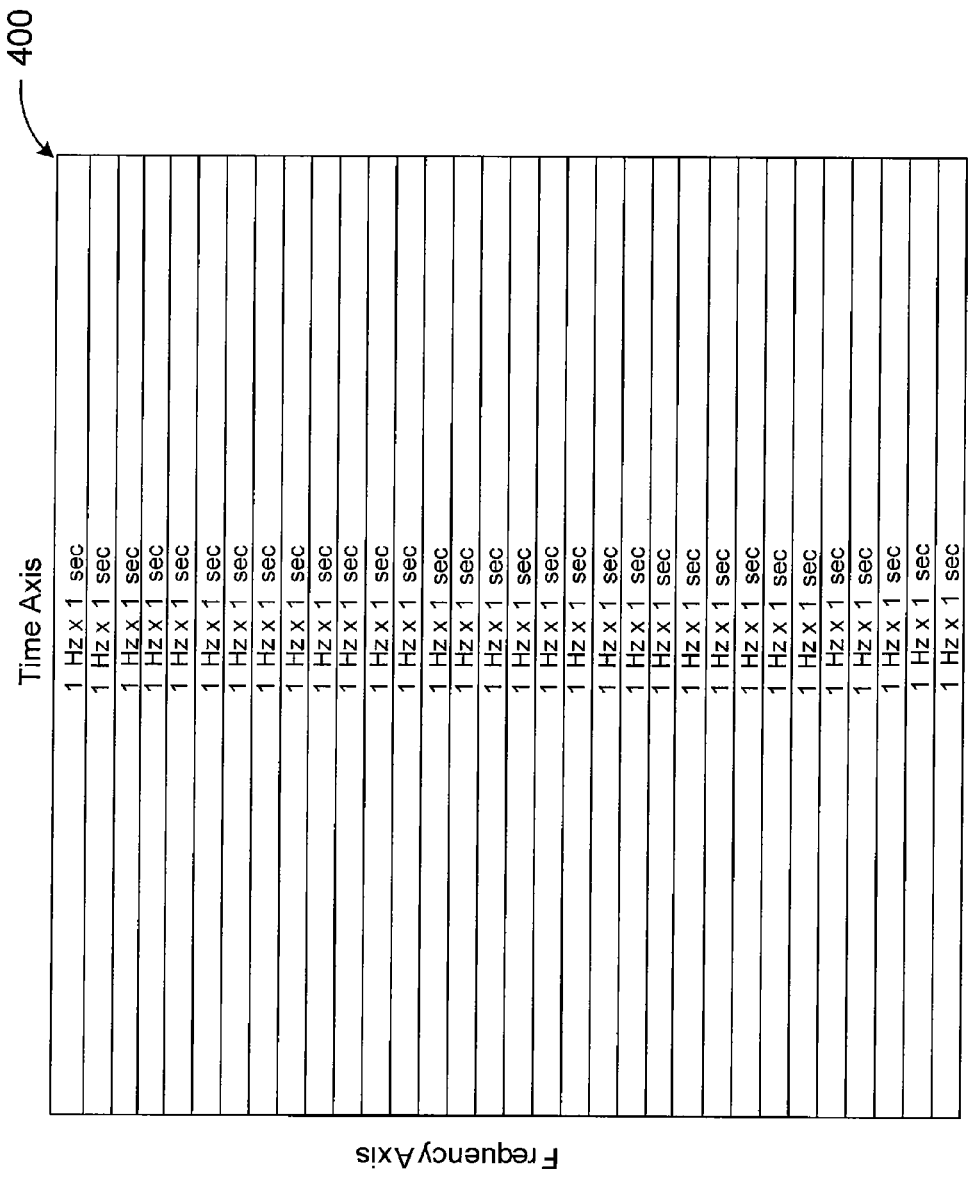
FIG. 4 depicts a frequency division multiplexing scheme as applied to a frequency channel having a bandwidth of 32 Hz over a duration of 1 second.

In a second example, FIG. 4 depicts a frequency division multiplexing scheme 400 as applied to a frequency channel having a bandwidth of 32 Hz over a duration of 1 second. The channel is divided into 32 different frequency sub-channels each having a bandwidth of 1 Hz. A symbol may be transmitted in each 1 Hz frequency sub-channel over the duration of 1 second. In this example, each symbol also has a time-bandwidth product of 1 Hz-second.

Figure 5:
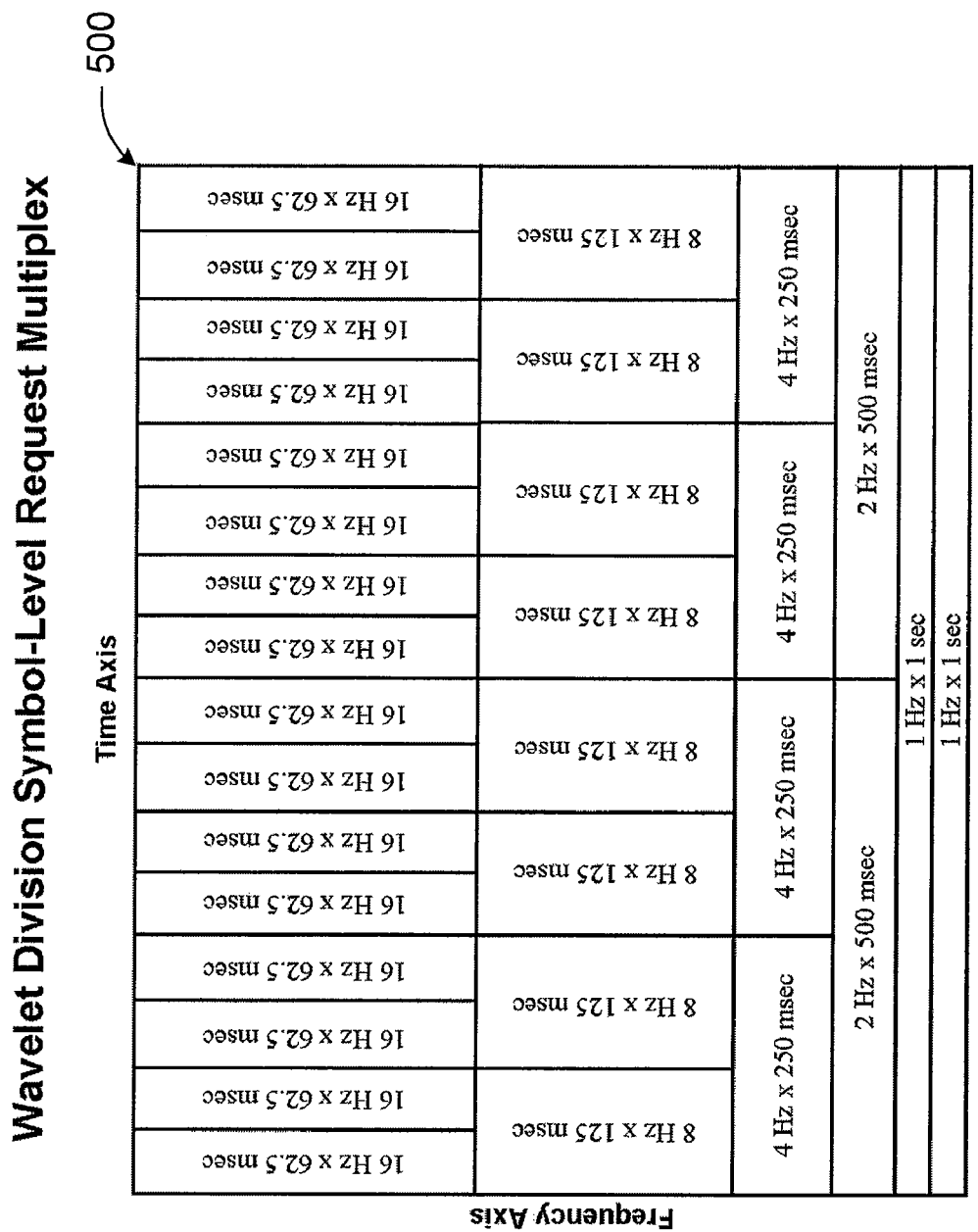
FIG. 5 depicts a wavelet division multiplexing scheme as applied to a frequency channel having a bandwidth of 32 Hz over a duration of 1 second.

In a third example, FIG. 5 depicts a wavelet division multiplexing scheme 500 as applied to a frequency channel having a bandwidth of 32 Hz over a duration of 1 second. The channel is divided into 32 different time and frequency symbol segments. 2 symbol segments have a bandwidth of 1 Hz with a duration of 1 second, 2 other symbol segments have a bandwidth of 2 Hz with a duration of ½ second, 4 other symbol segments have a bandwidth of 4 Hz with a duration of ¼ second, 8 other symbol segments have a bandwidth of 8 Hz with a duration of ⅛ second, and 16 additional symbol segments have a bandwidth of 16 Hz with a duration of 1/16 second. In this example, each symbol has a time-bandwidth product of 1 Hz-second, as well.

In a fourth example, a code division multiplexing scheme is applied to a frequency channel having a bandwidth of 32 Hz over a duration of 1 second. For this example, it is assumed that there are 32 different orthogonal code words, each comprising a unique 32-chip binary pattern. Each code word represents a unique "code channel." To send a symbol on a particular code channel, the symbol value is used to modulate the code word associated with the code channel, and the resulting signal is sent. In the case of binary phase shift keying (BPSK) symbols, for instance, a symbol having a value of "1" may be sent by simply sending the code word, and a symbol having a value of "0" may be sent by sending the inverted version (180-degree phase shift) of the code word. The 32 symbols sent using 32 different "code channels" are non-interfering, and as a group, they occupy a common 32 Hz by 1 second portion of the time-frequency space. In this example, each symbol has an effective time-bandwidth product of 1 Hz-second.

Symbol-Level Request

Referring back to FIG. 1, a symbol-level request may be sent from an access node, such as access nodes 104, 106, 108, and 110. Here, a symbol-level request refers to a request that can be sent in the form of a transmission signal having a time-bandwidth product comparable to that of a symbol.

The use of a symbol-level request allows for highly efficient utilization of the available signal space. Because of its compact size, a symbol-level request may not have sufficient capacity to carry a significant data payload. However information may be conveyed in the choice of the location within the request signal space in which the symbol-level request is transmitted. Thus, the existence of a symbol-level request in the request signal space, as well as the location where the symbol-level request exists in the request signal space, can convey important information that is used to facilitate the assignment of transmission opportunities within the shared communication medium.

Request Signal Space and Scheduled Transmission Signal Space

The shared communication medium utilized by access nodes 104, 106, 108, and 110 may be organized into a request signal space and a scheduled transmission signal space. Just as an example, the shared communication medium may be implemented as a satellite "return-link" that allows signals to be sent from access nodes 104, 106, 108, and 110 to scheduler node 102.

The request signal space may be used by access nodes 104, 106, 108, and 110 to send requests—e.g., symbol-level requests—to request opportunities for the scheduled transmission of data. Specifically, the request signal space may be organized into a plurality of request segments. Each request segment generally refers to a portion of request signal space that may be used for sending a request.

The scheduled transmission signal space may be used by access nodes 104, 106, 108, and 110 to transmit data once requests for transmission have been granted. The scheduled transmission signal space may be organized into a plurality of scheduled transmission segments. Each scheduled transmission segment generally refers to a portion of the scheduled transmission signal space that may be used for sending a data transmission.

The request signal space, as well as the scheduled transmission signal space, may be organized based on various multiplexing techniques. Thus, the plurality of request segments in the request signal space may represent allotments defined based on one or more types of multiplexing techniques applied to the request signal space. As mentioned previously, these may include time division multiplexing, frequency division multiplexing, wavelet division multiplexing, code division multiplexing, and/or other multiplexing techniques. Similarly, the plurality of scheduled transmission segments in the scheduled transmission space may represent allotments defined based on one or more types of multiplexing techniques applied to the scheduled transmission signal space.

As such, each request segment may have a different "location" within the request signal space. For example, if a request signal space is organized according to a time division multiplexing technique, each request segment may comprise a different time slot in the request signal space. Here, each particular request segment is said to correspond to a different location (in time) in the request signal space. The same concept can be applied to a request signal space organized according to a frequency division multiplexing technique. In such a case, each request segment may comprise a particular frequency sub-channel and be said to correspond to a different location (in frequency) in the request signal space. The same concept can be applied to a request signal space organized according to a code division multiplexing technique. In such a case, each request segment may comprise a particular code word and be said to correspond to a different location (in code space) in the request signal space. Similarly, the concept can be applied to a request signal space organized according to a combination of different multiplexing techniques, such as a combination of time division multiplexing and frequency division multiplexing techniques. In this particular example, each request segment may comprise a particular time slot in a particular frequency sub-channel and be said to correspond to a different location (in time and frequency) in the request signal space.

Also, the separation between the request signal space and the scheduled transmission signal space may be based on different multiplexing techniques. In one embodiment, time division multiplexing is employed. For example, the request signal space and the scheduled transmission signal space may be defined over different time slots and a common frequency range. In another embodiment, frequency division multiplexing is employed. For example, the request signal space and the scheduled transmission signal space may be defined over a common time duration and different frequency ranges. In yet another embodiment, code division multiplexing is employed. For example, the request signal space and the scheduled transmission signal space may be defined over a common time duration and a common frequency range, but using different code words. Other embodiments of the invention may involve different combinations and/or variations.

Feedback Signal Space

A feedback signal space may be utilized for sending the assignment messages from scheduler node 102 to access nodes 104, 106, 108, and 110. In some embodiments of the invention, the feedback space is not a part of the shared communication medium. Continuing with a satellite system example, the feedback signal space may be implemented as a satellite "forward-link" that allows signals to be sent from scheduler node 102 to access nodes 104, 106, 108, and 110. This satellite "forward-link" may be separate from the "return-link" mentioned previously.

The present invention broadly covers different combinations of multiplexing techniques as applied to the request signal space and/or the scheduled transmission signal space. In the figures discussed below, a number of examples of such multiplexing combinations are presented. The various combinations of multiplexing techniques described below are presented for illustrative purposes and are not intended to restrict the scope of the invention.

In the figures below, only a representative portion of the relevant signal space is shown. For example, if four frames of signals are shown, it should be understood that more frames may be used even though they are not explicitly illustrated. Also, the particular proportions of the various signal space designs are provided as mere examples.

Figure 6:
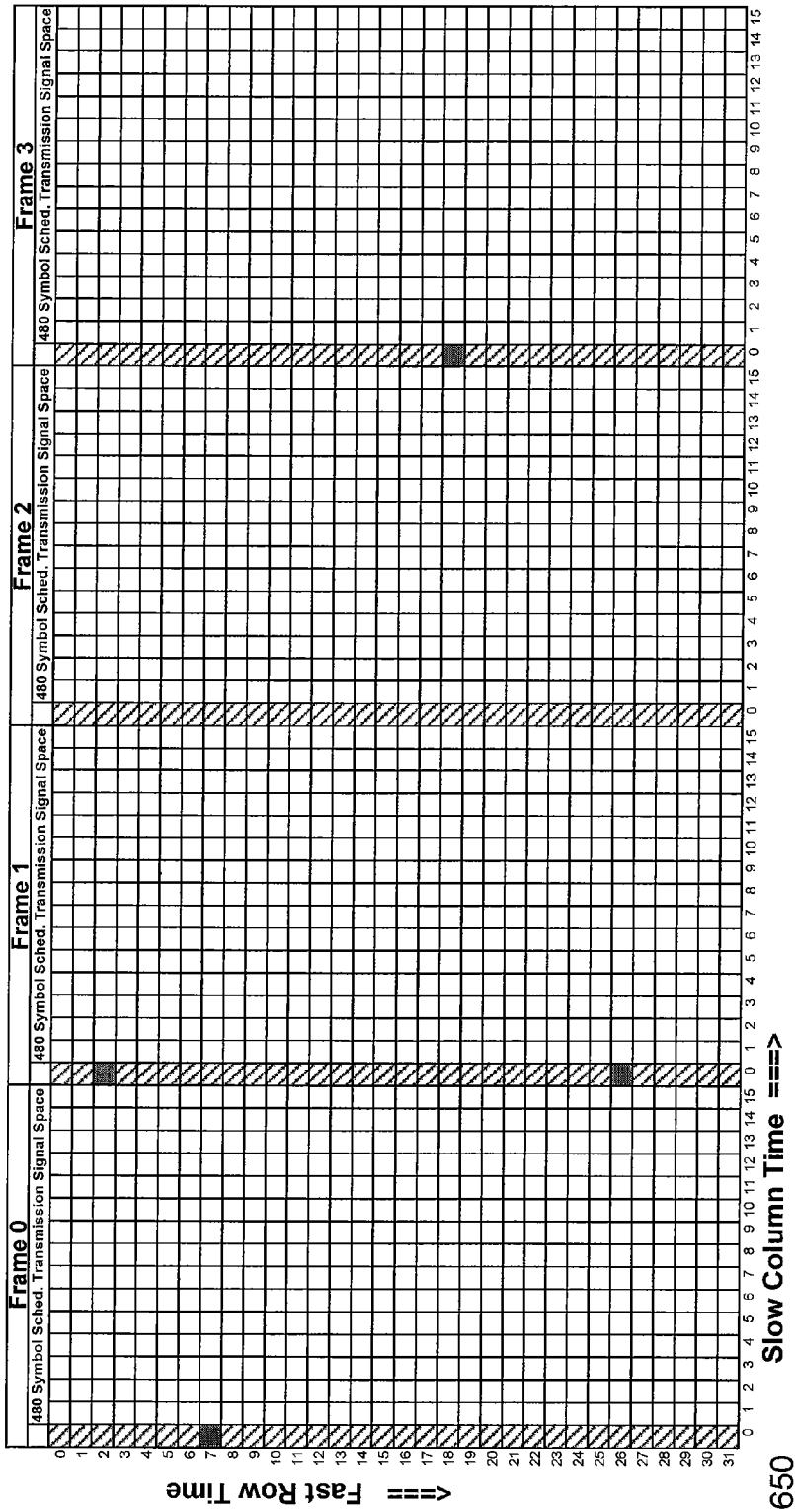
FIG. 6 is an illustrative signal diagram showing time division multiplexing as utilized to partition the request signal space and the scheduled transmission signal space, with time division multiplexing request segments and scheduled transmission segments.

Time Division Multiplexing Request Signal Space and Scheduled Transmission Signal Space Partitioning with Time Division Multiplexing Request Segments and Scheduled Transmission Segments FIG. 6 is an illustrative signal diagram showing time division multiplexing (TDM) as utilized to partition the request signal space and the scheduled transmission signal space, with TDM request segments and scheduled transmission segments. The figure shows a representation of shared communication medium 600 that includes a request signal space and a scheduled transmission signal space. Separately, the figure shows a feedback signal space 650.

In this particular embodiment, the shared communication medium 600 is organized as one continuous sequence of TDM time slots. For example, the shared communication medium 600 may comprise a particular frequency channel. Each TDM time slot occupies the entire bandwidth of the frequency channel, but only for a specific time duration. Here, the TDM time slots are shown as being organized into "frames," such as Frame 0, Frame 1, Frame 2, and Frame 3. For ease of illustration, FIG. 6 presents the TDM time slots in multiple columns, instead of one continuous column. Nevertheless, it should be understood that the TDM time slots represent a single sequence of time slots that are sequentially transmitted.

For example, FIG. 6 shows that Frame 0 includes 512 TDM time slots. These 512 TDM time slots are shown as being arranged in a rectangular grid having 16 columns (Column 0 through Column 15) and 32 rows (Row 0 through Row 31). The sequence of TDM time slots is arranged in time as follows. Slots 0 through 31 of Column 0, followed by Slots 0 through 31 of Column 1, followed by Slots 0 through 31 of Column 2, and so on. In this manner, the entire sequence of 512 time slots in Frame 0 is arranged sequentially in time. Frame 1 is structured similarly and follows Frame 0. That is, the last time slot of Frame 0 is followed by the first slot of Frame 1. Frame 2 is structured similarly and follows Frame 1. Frame 3 is structure similarly and follows Frame 2, and so on. Thus, the entire sequence of TDM time slots contained in all the frames, including Frames 0, 1, 2, and 3, is arranged sequentially in time.

In the particular grid representation shown in FIG. 6, time can be seen as proceeding down each column of TDM time slots. Hence the direction down each column, across multiple rows, is labeled as "Fast Row Time." Only after proceeding through all the TDM time slots in a column can the next column be started. Thus, it takes longer to proceed from one column to the next. Hence the direction across multiple columns is labeled as "Slow Column Time."

In FIG. 6, the request signal space and scheduled transmission signal space are defined on the basis of these TDM time slots. Thus, in this example, the request signal space and the scheduled transmission signal space are separated using TDM multiplexing. Here, each frame includes a number of request segments and a single scheduled transmission segment. In Frame 0, for example, the first 32 time slots are considered 32 request segments (Column 0). The next 480 time slots are considered one scheduled transmission segment, made up of 480 symbols (Columns 1 through 15). Other frames, such as Frames 1, 2, and 3, are structured in a similar manner.

FIG. 6 shows the following types of signals allotments: (1) Unoccupied Request Time Slot, (2) Occupied Request Time Slot, and (3) Scheduled Transmission Signal Space. In this example, only some of the available request segments are occupied by actual requests sent from one or more access nodes. Thus, some request segments are shown as unoccupied request slots, and others are shown as occupied request slots. Each scheduled transmission segment is shown as including a number of symbols, referred to as schedule transmission data symbols.

When an access node, such as access nodes 104, 106, 108, and 110 of FIG. 1, needs to request a scheduled transmission, it sends out a request in one of the request segments. Here, it is assumed that a TDM system is implemented in which all of the nodes are time-synchronized, such that every node has the capability to send signals in the appropriate time slots. Of course, in practice signals sent from various nodes may not arrive in their respective time slots with perfect timing accuracy. The TDM system may be designed to handle such imperfections, up to certain tolerances.

In one example, the request signals shown in FIG. 6 may be sent as follows. Node 104 may send a request in Slot 7 of the request signal space (Column 0) in Frame 0. Node 106 may send a request in Slot 2 of the request signal space (Column 0) in Frame 1. Node 108 may send a request in Slot 26 of the request signal space (Column 0) in Frame 1. Finally, node 110 may send a request in Slot 18 of the request signal space (Column 0) in Frame 3. Again, access nodes 104, 106, 108, and 110 are shown in FIG. 1. Of course, an access node may also send multiple requests, sometimes in the same frame. Thus, in an alternative example, all four of the requests shown in FIG. 6 may be sent from access node 104. That is, node 104 may send the request in Slot 7 of the request signal space (Column 0) in Frame 0, the requests in Slot 2 and Slot 26 of the request signal space (Column 0) in Frame 1, and the request in Slot 18 of the request signal space (Column 0) in Frame 3.

Scheduler node 102 shown in FIG. 1 receives the requests and makes assignments to assign each request to a scheduled transmission segment. Thus, in response to the requests, scheduler 102 send out assignment messages in a feedback signal space 650. The assignment messages are broadcast to access nodes 104, 106, 108, and 110 to inform the access nodes of the assignments made, so that each access node may correctly send data in the assigned scheduled transmission segment(s).

FIG. 6 depicts an assignment message under a "robust first in, first out schedule mode." In this mode, each assignment message explicitly includes a pair of data: (1) an identifier for the request and (2) an identifier for the scheduled transmission segment associated with the request. In other words, the pairing of a request to an associated scheduled transmission segment is directly stated in the assignment message. For example, as shown in FIG. 6, the first assignment message includes the pair of data "REQ. 0:7, SCH. 13." This indicates that the request sent in the request segment known as "REQ. 0:7" (the request segment located at Frame 0, Slot 7) has been assigned the scheduled transmission segment known as "SCH. 13" (the scheduled transmission segment located in Frame 13). The rest of the assignment messages follow a similar format. The second assignment message includes the pair of data "REQ. 1:2, SCH. 14." The third assignment message includes the pair of data "REQ. 1:26, SCH. 15." The fourth assignment message includes the pair of data "REQ. 3:18, SCH. 16."

The entire request and assignment process takes place in an anonymous manner with respect to the identity of the access nodes. Thus, a symbol-level request sent from an access node does not explicitly identify the access node. For example, assume that access node 104 sent the symbol-level request in "REQ. 0:7" (Slot 7 of the request signal space of Frame 0). This symbol-level request is merely a symbol transmitted at a particular location within the request symbol space. The symbol-level request does not explicitly identify the access node 104. Similarly, the corresponding assignment message "REQ. 0:7, SCH. 13" broadcast from scheduler node 102 does not explicitly identify access node 104 as the intended recipient of the assignment message. Instead, the assignment message merely announces that the symbol-level request sent in the "REQ. 0:7" slot has been assigned to the scheduled transmission segment "SCH. 13." All of the access nodes 104, 106, 108, and 110 receive the broadcast assignment message. However, only access node 104 accepts the assignment and proceeds to send a data transmission in the scheduled transmission segment identified by the assignment. This is possible because each access node keeps track of the location(s) of the symbol-level request(s) it has sent. Access node 104 recognizes the request "REQ. 0:7" identified in the assignment as one of its own and thus accepts the assignment. The other access nodes 106, 108, and 110 do not recognize the request "REQ. 0:7" identified in the assignment as one of their own and thus do not accept the assignment.

In FIG. 6, the feedback signal space 650 is labeled as "Delayed Feedback Grant Channel." An assignment message sent in feedback signal space 650 may be delayed in the sense that it may not be broadcast until some time after (perhaps multiple frames after) the initial request is made.

Frequency Division Multiplexing Request Signal Space and Scheduled Transmission Signal Space Partitioning with Frequency Division Multiplexing/Time Division Multiplexing Request Segments and Scheduled Transmission Segments FIG. 7 is an illustrative signal diagram showing frequency division multiplexing (FDM) as utilized to partition the request signal space and the scheduled transmission signal space, with FDM/TDM request segments and scheduled transmission segments. The figure shows a representation of a shared communication medium 700 based on an FDM structure that includes a request signal space and a scheduled transmission signal space. The request signal space comprises a narrow FDM frequency channel, labeled as Request Channel. The scheduled transmission signal space comprises two wide FDM frequency channels, labeled as Scheduled Transmission Channel 1 and Scheduled Transmission Channel 2. A feedback signal space is not explicitly shown in this figure but may also be implemented in a manner similar to that described with respect to FIG. 6.

This example demonstrates that the request signal space and the scheduled transmission signal space may have very different symbol structures. In the request signal space, a symbol is transmitted over a narrow channel over a longer time duration. These are labeled as Request Slots 0, 1, 2, 3, etc. in the figure. By contrast, in the schedule transmission signal space, a symbol is transmitted over one of the two wide channels over a shorter time duration. These are labeled as Data Transmission Indices 0, 1, 2, 3, . . . , 63 in the figure. Despite this difference in symbol structures, a symbol transmitted in the request signal space may have the same time-bandwidth product as a symbol transmitted in the scheduled transmission signal space. Thus, FIG. 7 presents request segments based on FDM and TDM, as well as scheduled transmission segments based on FDM and TDM.

FIG. 7 shows the following types of signal allotments: (1) Unoccupied Request Slot and (2) Occupied Request Slot. In this example, only one of the available request segments is occupied by an actual request sent from one of the access nodes. Thus, some request segments are shown as unoccupied request slots, and one is shown as an occupied request slot. FIG. 7 also shows scheduled transmission segments. Each scheduled transmission segment comprises a block of data symbols referred to here as a data transmission segment.

FIG. 7 presents an illustrative request as sent from one or more access nodes such as 104, 106, 108, and 110. The request shown is sent in Slot 1 of the Request signal space. In response, scheduler node 102 broadcasts assignment messages in feedback signal space (not shown). The assignment messages are broadcast to access nodes 104, 106, 108, and 110 to inform the access nodes of the assignments made, so that each access node may correctly send data in the assigned scheduled transmission segment(s).

Also shown in FIG. 7 are guard zones, specifically frequency guard bands positioned between various carriers. A first frequency guard band is positioned between Scheduled Transmission Channel 1 and the Request Channel. A second frequency guard band is positioned between the Request Channel and Scheduled Transmission Channel 2. The use of these guard bands can improve reception and processing of a signal on a particular carrier by providing separation and reduced interference from neighboring carriers.

Figure 8:
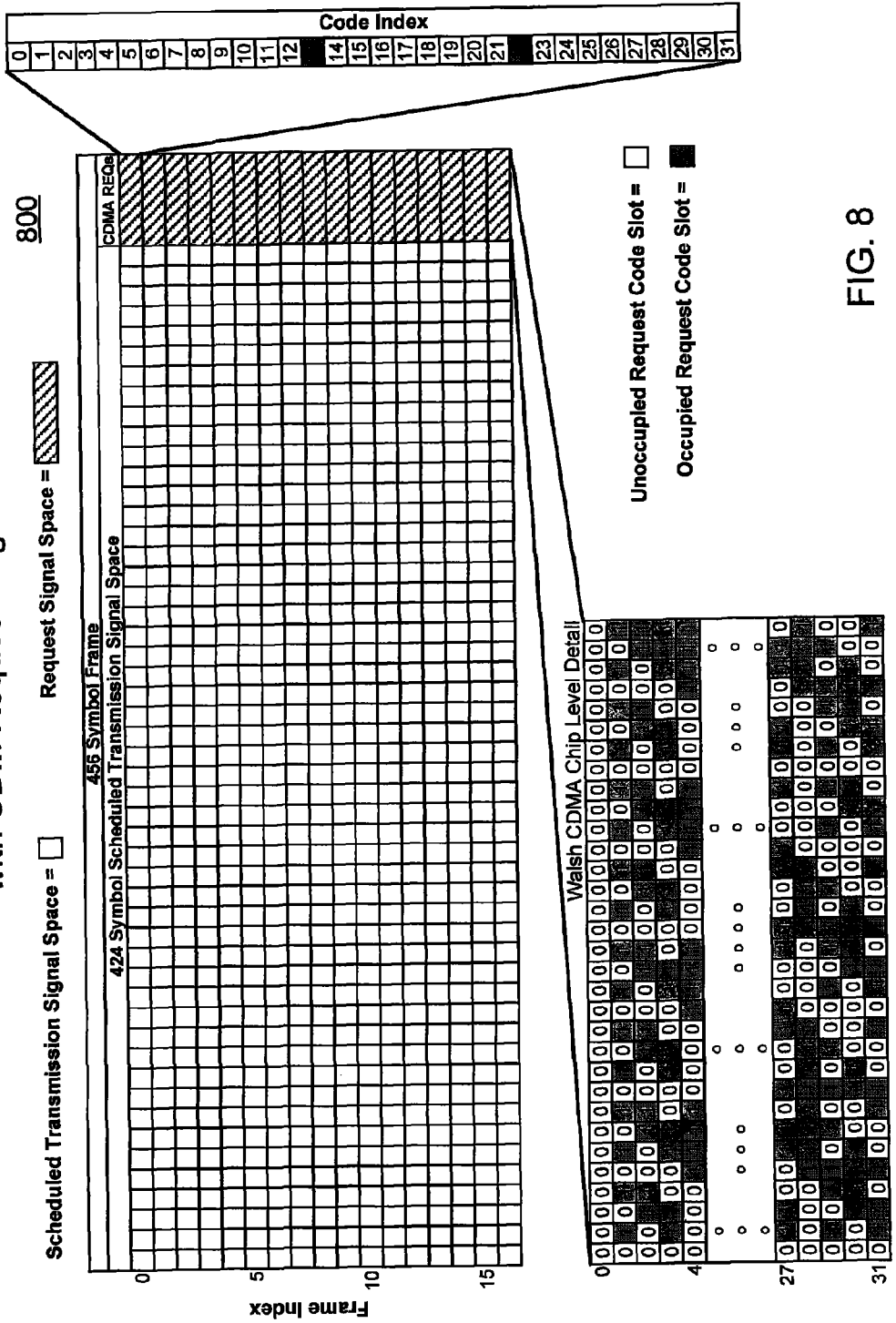
FIG. 8 is an illustrative signal diagram showing time division multiplexing as utilized to partition the request signal space and the scheduled transmission signal space, with code division multiplexing request segments.

Time Division Multiplexing Request Signal Space and Scheduled Transmission Signal Space Partitioning with Code Division Multiplexing Request Segments FIG. 8 is an illustrative signal diagram showing TDM as utilized to partition the request signal space and the scheduled transmission signal space, with code division multiplexing (CDM) request segments. The figure shows a representation of a shared communication medium 800 based on a TDM structure that includes a request signal space and a scheduled transmission signal space. A feedback signal space is not explicitly shown in this figure but may also be implemented.

The structure shown in FIG. 8 is based on sequentially ordered frames. Seventeen such frames are shown in this figure, labeled by frame indices 0 through 16. Additional frames may follow. In this example, each frame has a total length of 456 symbols. This total length is divided between a scheduled transmission signal space portion having a length of 424 symbols and a request signal space portion having a length of 32 symbols.

For ease of illustration, the numerous symbols are not individually shown in this figure. Instead, boxes representing multiple symbols are shown. In the transmission signal space, each short box represents 8 scheduled transmission symbols. In the request signal space, each long box represents a 32-chip CDM request interval. Although the signal segments representing individual chips of any particular CDM code may be similar in design to the signal segments representing the scheduled transmission symbols, the chips of any particular code are linked in a particular code pattern (e.g., a 32-chip pattern), whereas the scheduled transmission symbols may be individually modulated. As shown, FIG. 8 presents scheduled transmission segments based on TDM and request segments based on CDM.

More specifically, in this example each 456-symbol frame supports 1 scheduled transmission segment and 32 request segments. The 1 scheduled transmission segment comprises the first 424 symbols of the frame. The 32 request segments comprise the 32 possible code words that may be transmitted in the remaining portion of the frame. In other words, the remaining portion of the frame is code division multiplexed and organized as a 32-chip request interval.

Here, a 32-chip Walsh CDMA code is shown. In this code space there exist 32 different possible code sequences, or code words ("M"), each having a length of 32 chips ("L"). Indices 0 through 31 are used to identify the 32 different code words. FIG. 8 shows the chip-level detail of the 32 code words. Other types and lengths of code may be used in accordance with the invention.

One or more of the access nodes 104, 106, 108, and 110 can send one or more requests (each in the form of one of the 32 possible code words) in a particular request interval. This is illustrated in FIG. 8. In the example shown, two requests are sent in a request interval. The first request is a signal spread according to Code Word 13. The second request is a signal spread according to Code Word 22. Thus, in this example, CDM allows the request interval to support 32 request segments, i.e., codes slots. As shown in FIG. 8, two of these request segments are occupied. The remaining thirty request segments are unoccupied.

Scheduler node 102 detects reservation requests by correlation over the request interval against all reservation request codes. Scheduler node 102 broadcasts assignment messages in feedback signal space (not shown). The assignment messages are broadcast to access nodes 104, 106, 108, and 110 to inform the access nodes of the assignments made, so that each access node may correctly send data in the assigned scheduled transmission segment(s).

The entire request and assignment process takes place in an anonymous manner with respect to the identity of the access nodes. Thus, a symbol-level request sent from an access node does not explicitly identify the access node. For example, assume that access node 104 sends the symbol-level request comprising Code Word 13. This symbol-level request is merely a signal transmitted at a particular code location within the request symbol space. The symbol-level request does not explicitly identify access node 104.

Similarly, the corresponding assignment message would not explicitly identify access node 104 as the intended recipient of the assignment message. Instead, the assignment message merely announces that the symbol-level request corresponding to Code Word 13 in Frame 0 has been assigned to a particular scheduled transmission segment. All of the access nodes 104, 106, 108, and 110 receive the broadcast assignment message. However, only access node 104 accepts the assignment and proceeds to send a data transmission in the scheduled transmission segment identified by the assignment. This is possible because each access node keeps track of the location(s) in code space of the symbol-level request(s) it has sent in each frame. Access node 104 recognizes the request identified in the assignment as one of its own and thus accepts the assignment. The other access nodes 106, 108, and 110 do not recognize the request identified in the assignment as one of their own and thus do not accept the assignment.

Collisions Between Requests

A collision occurs when two or more symbol-level requests sent from different access nodes, such as access nodes 104, 106, 108, and 110, collide with one another. Such collisions may occur if the two or more symbol-level requests are sent in the same request segment. If scheduler node 102 detects such a collision, it may simply not send an assignment. When the access node senses that a symbol-level request it has sent has not been responded to (e.g., no assignment message is received from the scheduler node 102 in response to the symbol-level request), the access node may retransmit the symbol-level request. The retransmission technique may also take into account considerations such as retransmission count, latency, and quality of service (QOS). For example, the access node may keep track of a retransmission count, such as the number of times a particular request has been retransmitted. If the retransmission count exceeds a maximum threshold, the request may be discarded so that no further retransmission is attempted. Also, the access node may keep track of a measure of latency, such as the amount of time that has elapsed since the access node began attempting to request a scheduled transmission segment for a particular message. If the latency exceeds a maximum threshold, the request may be discarded so that no further retransmission is attempted. Furthermore, the access node may take into account a measure of QOS for a request. If the request is associated with a higher QOS, the request may be given a higher priority in retransmission Request collisions not detected by scheduler node 102 as a collision may need to be handled differently. Here, two or more symbol-level requests collide. However, scheduler node 102 fails to recognize that a collision has occurred. Instead, scheduler node 102 treats the collision as a valid symbol-level request. Thus, scheduler node 102 sends an assignment message associating the symbol-level request to a scheduled transmission segment. Each access node that sent a symbol-level request involved in the collision accepts this assignment, and in response sends its own data transmission. As a result, a collision of multiple data transmissions can occur in the scheduled transmission segment specified in the assignment.

The system may handle such a scenario in a number of ways. For example, the system may require acknowledgment of receipt of a data transmission. Here, when an access node, such as access nodes 104, 106, 108, and 110, sends a data transmission in an assigned scheduled transmission segment, the access node expects the intended recipient to respond by sending an acknowledgement (ACK) message to confirm successful receipt of the data transmission. If the data transmission is not successfully received, as indicated by the lack of an ACK message from the intended recipient, the access node re-sends the data transmission. The process of re-sending the data transmission may be similar to that of the original transmission. That is, the access node may first send a symbol-level request, then receive an assignment associating the symbol-level request to a particular scheduled transmission segment, and finally send the data transmission in the assigned scheduled transmission segment.

Alternatively, the scheduler node 102 may assign follow up request segments to resolve collisions. Just as an example, assume two access nodes 104 and 106 each send an initial request in the same initial request segment. This causes a collision. Even if scheduler node 102 can properly decode the initial request, it remains ambiguous as to which access node should be deemed the originator of the request. If scheduler node 102 does not resolve the collision and instead simply sends an assignment message associating the initial request with a scheduled transmission segment, both access nodes 104 and 106 may accept the assignment and attempt to send a data transmission in the scheduled transmission segment. The likely result is that the signals will be jumbled and neither data transmission will be properly received.

Thus, instead of just sending an assignment associating the initial request segment with a scheduled transmission segment, scheduler node 102 may send an assignment associating the initial request segment with one or more follow up request segments. These follow up request segments provide an opportunity for access nodes involved in a collision to send secondary requests that may avoid collision with one another.

Continuing with the above example of a collision involving access nodes 104 and 106, scheduler node 102 may detect the possible collision and send an assignment that associates the initial request with 32 follow up request segments. Access node 104 responds by randomly selecting 1 out of the 32 follow up request segments and sending a secondary request in its randomly selected request segment (e.g., request segment 8). Access node 106 also responds by randomly selecting 1 out of the 32 follow up request segments and sending a secondary request in its randomly selected request segment (e.g., request segment 13).

There is a high probability (31/32) that access nodes 104 and 106 would randomly select different ones of the 32 possible follow up request segments to send their respective secondary requests. If this scenario occurs (more likely), the collision has been resolved. That is, now access nodes 104 and 106 have sent secondary requests in distinct request segments. Scheduler node 102 can simply process the secondary requests separately by assigning a scheduled transmission segment to the secondary request sent from access node 104, and separately assigning another scheduled transmission segment to the secondary request sent from access node 106.

Of course, there is a low probability (1/32) that access nodes 104 and 106 would happen to select the same one out of the 32 possible follow up segments to send their respective secondary requests. If this scenario occurs (less likely), the collision remains unresolved. Here, scheduler node 102 may repeat the procedure over again in order to resolve the collision. That is, scheduler node 102 may send yet another assignment to assign another set of 32 follow up request segments. Access nodes 104 and 106 would again separately make random selections out of the 32 follow up request segments, and so on. This process may repeat until the collision is resolved or until a termination condition is reached.

While the example discussed above involves two access nodes 104 and 106, the approach is applicable in collision situations involving more than two nodes. Also, the probability of collision resolution in each iteration can be modified by changing the number of follow up request segments assigned (e.g., to a number greater than or less than 32).

In one embodiment of the invention, the probability of collision is reduced by reducing the probability of two or more access nodes sending an initial request in the same request segment. By reducing the probability of collision during an initial request, fewer collisions occur and thus fewer resources are required to resolve collisions. For example, the probability of collision can be reduced by increasing the number of request segments in the request signal space. By increasing the number of request segments, the probability that more than one access node will send an initial request in the same initial request segment is reduced.

Multiple Request Intervals

Figure 9:
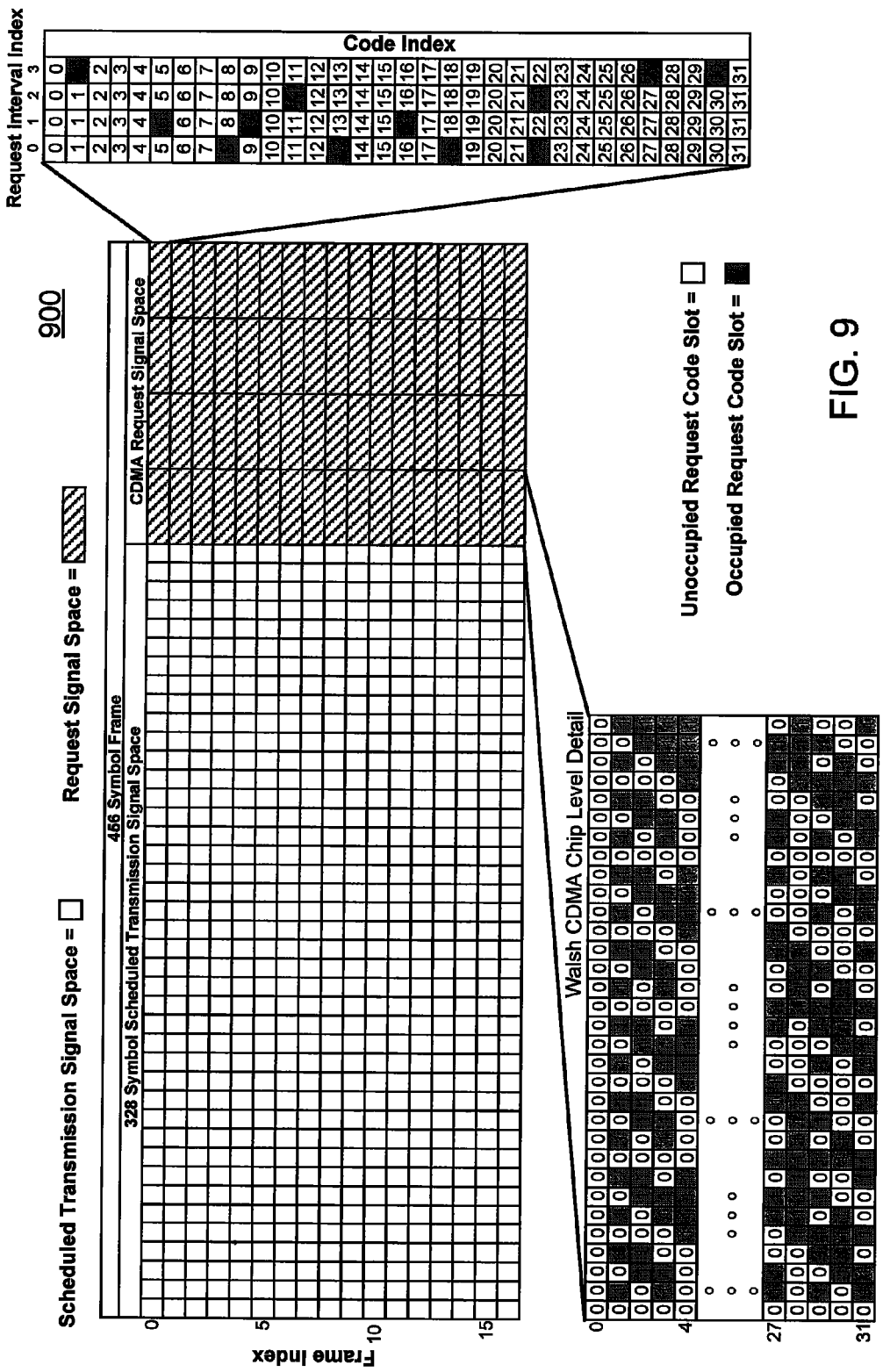
FIG. 9 is an illustrative signal diagram showing time division multiplexing as utilized to partition the request signal space and the scheduled transmission signal space, with code division multiplexing request segments organized into multiple request intervals, according to an embodiment of the invention.

In another embodiment of the invention, the probability of collision is reduced by organizing the request signal space into multiple request intervals. Here, each request includes a request segment from each request interval. For example, FIG. 9 is an illustrative signal diagram showing TDM as utilized to partition the request signal space and the scheduled transmission signal space, with CDM request segments organized into multiple request intervals, according to an embodiment of the invention. The figure shows a representation of a shared communication medium 900 based on a TDM structure that includes a request signal space and a scheduled transmission signal space. A feedback signal space is not explicitly shown in this figure but may also be implemented in a manner similar to that described previously.

The structure shown in FIG. 9 is similar to that of FIG. 8, except the CDM request segments are organized into 4 request intervals, rather than the single request interval of FIG. 8. The 4 request intervals in FIG. 9 are labeled by interval indices 0 through 3. The structure is again based on sequentially ordered frames. Seventeen such frames are shown in this figure, labeled by frame indices 0 through 16. Additional frames may follow. In this example, each frame has a total length of 456 symbols. This total length is divided among two different portions of the frame: (1) a scheduled transmission signal space portion having a length of 328 symbols, and (2) a request signal space portion having a length of 128 symbols (or 4 request intervals each 32-chips in length).

For ease of illustration, the numerous symbols are not individually shown in this figure. Instead, boxes representing multiple symbols are shown. In the transmission signal space, each short box represents 8 scheduled transmission symbols. In the request signal space, each long box represents a 32-chip CDM request interval. Thus, FIG. 9 presents scheduled transmission segments based on TDM and multiple request intervals with request segments based on CDM.

More specifically, in this example each 456-symbol frame supports 1 scheduled transmission segment and 4 request intervals each having 32 request segments. The 1 scheduled transmission segment comprises the first 328 symbols of the frame. The 4 request intervals comprise the remaining 128 symbols of the frame. Each request interval comprises 32 request segments, or 32 possible code words. In other words, each request interval is code division multiplexed and organized as a 32-chip request interval.

Again, a 32-chip Walsh CDMA code is shown as an example. In Request Interval 0 there exists M=32 code words, each having a length of L=32 chips. Indices 0 through 31 are used to identify the 32 different possible code words. FIG. 9 shows the chip-level detail of the 32 code words. In Request Interval 1 there exists M=32 code words, each having a length of L=32 chips (not shown). In Request Interval 2 there exists M=32 code words, each having a length of L=32 chips (not shown). Similarly, in Request Interval 3 there exists M=32 code words, each having a length of L=32 chips (not shown). Thus, in this example, CDM allows each request interval to support 32 request segments, i.e., code slots. Other types and lengths of code may be used in accordance with the invention.

One or more of the access nodes 104, 106, 108, and 110 can send one or more requests. Here, each request includes one of the 32 possible code words in each of the 4 request intervals. Thus, each request comprises a request sequence of 4 code words. Each code word is independently and randomly chosen. This is illustrated in FIG. 9. In the example shown, there are four occupied request segments in Request Interval 0. The first request is a signal spread according to Code Word 8. The second request is a signal spread according to Code Word 13. The third request is a signal spread according to Code Word 18. The fourth request is a signal spread according to Code Word 22. Thus, in this example, four of the request segments are occupied. The remaining twenty-eight request segments are unoccupied.

FIG. 9 shows three occupied request segments in Request Interval 1. The first request is a signal spread according to Code Word 5. The second request is a signal spread according to Code Word 9. The third request is a signal spread according to Code Word 16. Thus, as shown in FIG. 9, three of the request segments in Request Interval 1 are occupied. The remaining twenty-nine request segments are unoccupied.

FIG. 9 shows two occupied request segments in Request Interval 2. The first request is a signal spread according to Code Word 11. The second request is a signal spread according to Code Word 22. Thus, as shown in FIG. 9, two of the request segments in Request Interval 2 are occupied. The remaining thirty request segments are unoccupied.

FIG. 9 shows three occupied request segments in Request Interval 3. The first request is a signal spread according to Code Word 1. The second request is a signal spread according to Code Word 27. The third request is a signal spread according to Code Word 30. Thus, as shown in FIG. 9, three of the request segments in Request Interval 3 are occupied. The remaining twenty-nine request segments are unoccupied.

In one example, the request signals shown in Frame 0 of FIG. 9 may be sent as follows. Node 104 may send a request occupying Slot 8 of Request Interval 0, Slot 5 of Request Interval 1, Slot 11 of Request Interval 2, and Slot 1 of Request Interval 3.

Node 106 may send a request occupying Slot 13 of Request Interval 0, Slot 5 of Request Interval 1, Slot 11 of Request Interval 2, and Slot 1 of Request Interval 3.

Node 108 may send a request occupying Slot 18 of Request Interval 0, Slot 9 of Request Interval 1, Slot 22 of Request Interval 2, and Slot 27 of Request Interval 3.

Finally, node 110 may send a request occupying Slot 22 of Request Interval 0, Slot 16 of Request Interval 1, Slot 22 of Request Interval 2, and Slot 30 of Request Interval 3.

Scheduler node 102 detects reservation requests by correlation over each request interval against all reservation request codes. Scheduler node 102 selects the request interval with the most occupied request segments to use for assignment of scheduled transmission segments. In FIG. 9, Request Interval 0 has four occupied request segments, which is more than the other request intervals. Thus, scheduler node 102 selects Request Interval 0 to use for assignment of scheduled transmission segments. The other request intervals have fewer occupied request segments because either (1) a collision occurred when two or more access nodes selected the same request segment(s) in the same request interval, or (2) one or more of the request segments selected by the access nodes were not detected by scheduler node 102. Thus, selecting the request interval with the most occupied request segments increases the probability that a scheduled transmission segment will be assigned to only one access node, thus avoiding subsequent collisions during data transmission.

In response, scheduler node 102 broadcasts assignment messages based on Request Interval 0 in the feedback signal space (not shown). The assignment messages are broadcast to access nodes 104, 106, 108, and 110 to inform the access nodes of the assignments made, so that each access node may correctly send data in the assigned scheduled transmission segments.

The entire request and assignment process takes place in an anonymous manner with respect to the identity of the access nodes. Thus, a request sent from an access node does not explicitly identify the access node. Instead, requests are merely signals transmitted at a particular code location within the request signal space. The request does not explicitly identify access nodes 104, 106, 108, or 110.

Similarly, the corresponding assignment message would not explicitly identify the intended recipient of the assignment message. Instead, the assignment message merely announces that, in Frame 0, the symbol-level requests in Request Interval 0 corresponding to Code Word 8, Code Word 13, Code Word 18, and Code Word 22 have been assigned to particular scheduled transmission segments. For example, as discussed above, scheduler node 102 selects Request Interval 0 to use for the assignment of scheduled transmission segments because scheduler node 102 detected the most occupied request segments in this request interval. The corresponding assignment messages include the pair of data "REQ. 0:0:8, SCH. 13" (assuming Transmission Segment 13 is the next available scheduled transmission segment). This indicates that the request sent in the request segment known as "REQ. 0:0:8" (the request segment located at Frame 0, Request Interval 0, Slot 8) has been assigned the scheduled transmission segment known as "SCH. 13" (the scheduled transmission segment located in Frame 13). The remaining assignment messages follow a similar format. The second assignment message includes the pair of data "REQ. 0:0:13, SCH. 14." The third assignment message includes the pair of data "REQ. 0:0:18, SCH. 15." The fourth assignment message includes the pair of data "REQ. 0:0:22, SCH. 16."

Each of the access nodes 104, 106, 108, and 110 receive the broadcast assignment message. However, in the above example, access node 104 only accepts the assignment message "REQ. 0:0:8, SCH. 13," access node 106 only accepts the assignment message "REQ. 0:0:13, SCH. 14," access node 108 only accepts the assignment message "REQ. 0:0:18, SCH. 15," and access node 110 only accepts the assignment message "REQ. 0:0:22, SCH. 16." This is possible because each access node keeps track of the locations in code space of the symbol-level request(s) it has sent in each frame. Each access node recognizes the request identified in the assignment that corresponds to the request it sent. The access nodes do not recognize the requests identified in the assignment that were sent by other access nodes, and thus do not accept the other assignments.

Other embodiments of the invention may use different request and/or scheduling modes than those described above. For example, in some embodiments, request and assignment messages may not identify the frame in which the request originated. Instead, the timing synchronization of the system may allow the frame to be determined by scheduler node 102 as well as by access nodes 104, 106, 108, and 110. Similarly, in some embodiments, assignment messages may not identify the scheduled transmission segment associated with each request. Again, the timing synchronization of the system may allow for information on scheduled transmissions to be kept in a local transmission queue that can be updated by scheduler node 102 and accessed by access nodes 104, 106, 108, and 110.

While the example shown in FIG. 9 illustrates CDM request segments organized into multiple request intervals, the same concept can be applied to a request signal space organized according to other multiplexing techniques. For example, TDM request segments may be organized into multiple request intervals. In such a case, each request may include a sequence of request segments, with each segment chosen independently and randomly from each interval. Similarly, FDM request segments may be organized into multiple request intervals, or channels. In such a case, each request may include a sequence of request segments, with each segment chosen independently and randomly from each interval. The concept can also be applied to a request signal space organized according to a combination of different multiplexing techniques, such as a combination of TDM and FDM techniques. Here, each request interval may be organized to comprise particular time slots in particular frequency sub-channels. Each request may include a sequence of request segments, with each segment chosen independently and randomly from each interval. Other embodiments of the invention may involve other multiplexing techniques, different combinations, and/or variations.

Determining the Number of Request Intervals and Request Segments

In implementing a system with multiple reservation request intervals, as illustrated in FIG. 9, the number of request intervals and the number of request segments within each interval are primary considerations. These considerations impact the allocation of resources between the reservation signal space and the scheduled transmission signal space. An advantage of a system utilizing symbol-level requests is that it maximizes resources for data transmission. Increasing the number of request intervals and/or increasing the number of request segments reduce the probability of collision, but also require that additional resources be allocated from data transmission to reservation requests. Thus, these considerations must be balanced against the probability of collision during data transmission and the resources required to resolve such collisions.

An important factor affecting this balance is the system loading, or the expected number of concurrent requests. In the example of FIG. 9, discussed above, loading is the number of requests from access nodes 104, 106, 108, and 110 occurring within a particular frame, such as Frame 0. Each access node may send zero, one, or multiple requests in a particular frame. The following figures analyze the balance between these considerations for a system with CDM request segments organized into multiple request intervals, such as the system illustrated in FIG. 9. The analysis uses a code where the code length is equal to the number of orthogonal code words (e.g., a Walsh code). The analysis places an upper bound on probability by assuming that each request sent by an access node is detected.

Figure 10:
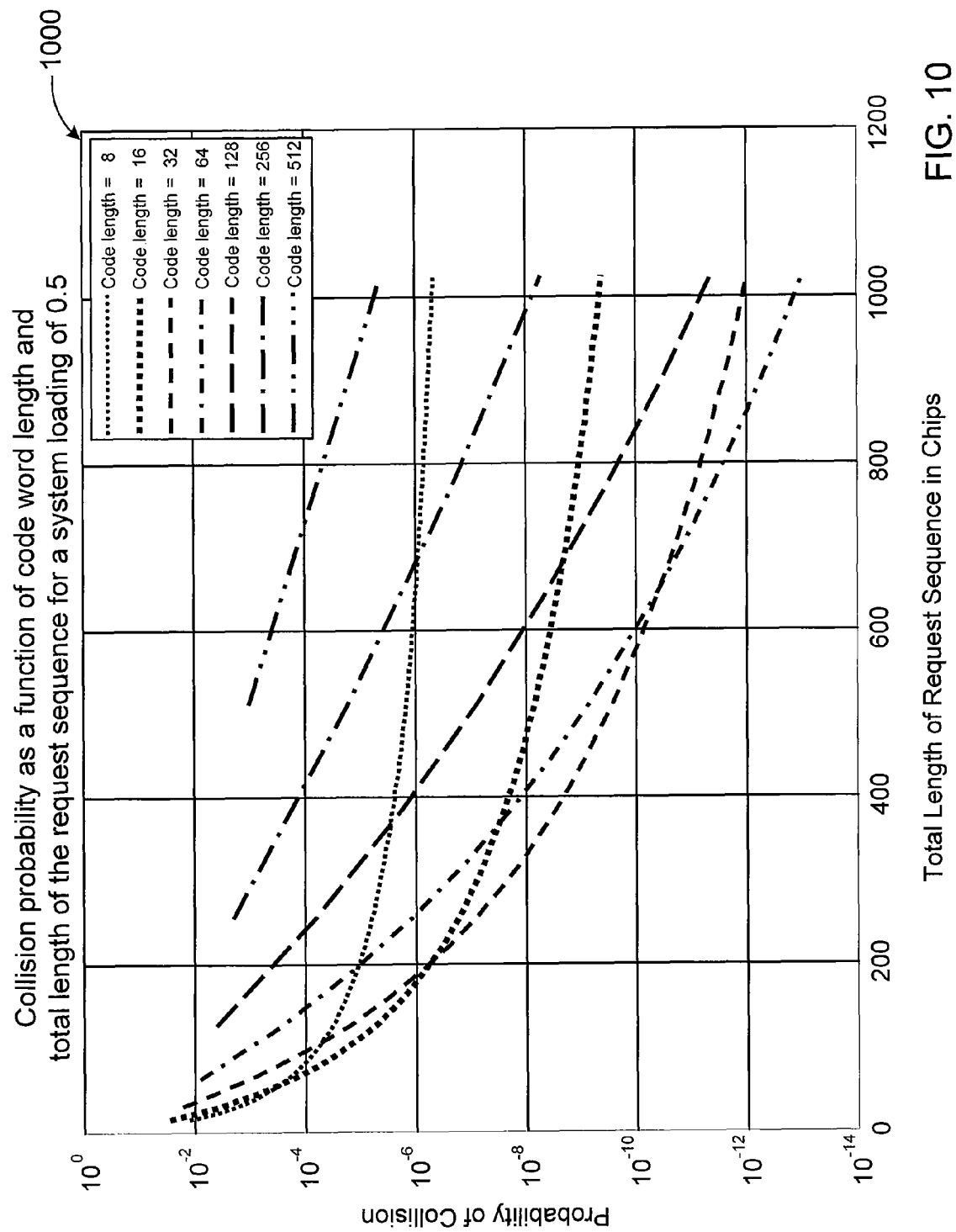
FIG. 10 is a plot of collision probability as a function of code word length and total length of the request sequence for a system loading of 0.5, according to an embodiment of the invention.

FIG. 10 is a plot 1000 of collision probability as a function of code word length and total length of the request sequence for a system loading of 0.5, according to an embodiment of the invention. A system loading of 0.5 means that one request is expected to occur for every two frames. The number of code words in a request sequence (or the number of request intervals) can be obtained by dividing values on the x-axis, which represent the total length of a request sequence, by the code word length. For example, a request sequence with a total length of 32-chips and a code word length of 8-chips has 4 code words in each request sequence. FIG. 10 shows that as the total length of the request sequence increases (or the number of code words in a request sequence increases), the probability of collision decreases. However, FIG. 10 also shows that for a given request sequence length, the probability of collision is not necessarily reduced by utilizing more short code words compared to utilizing fewer long code words.

Figure 11:
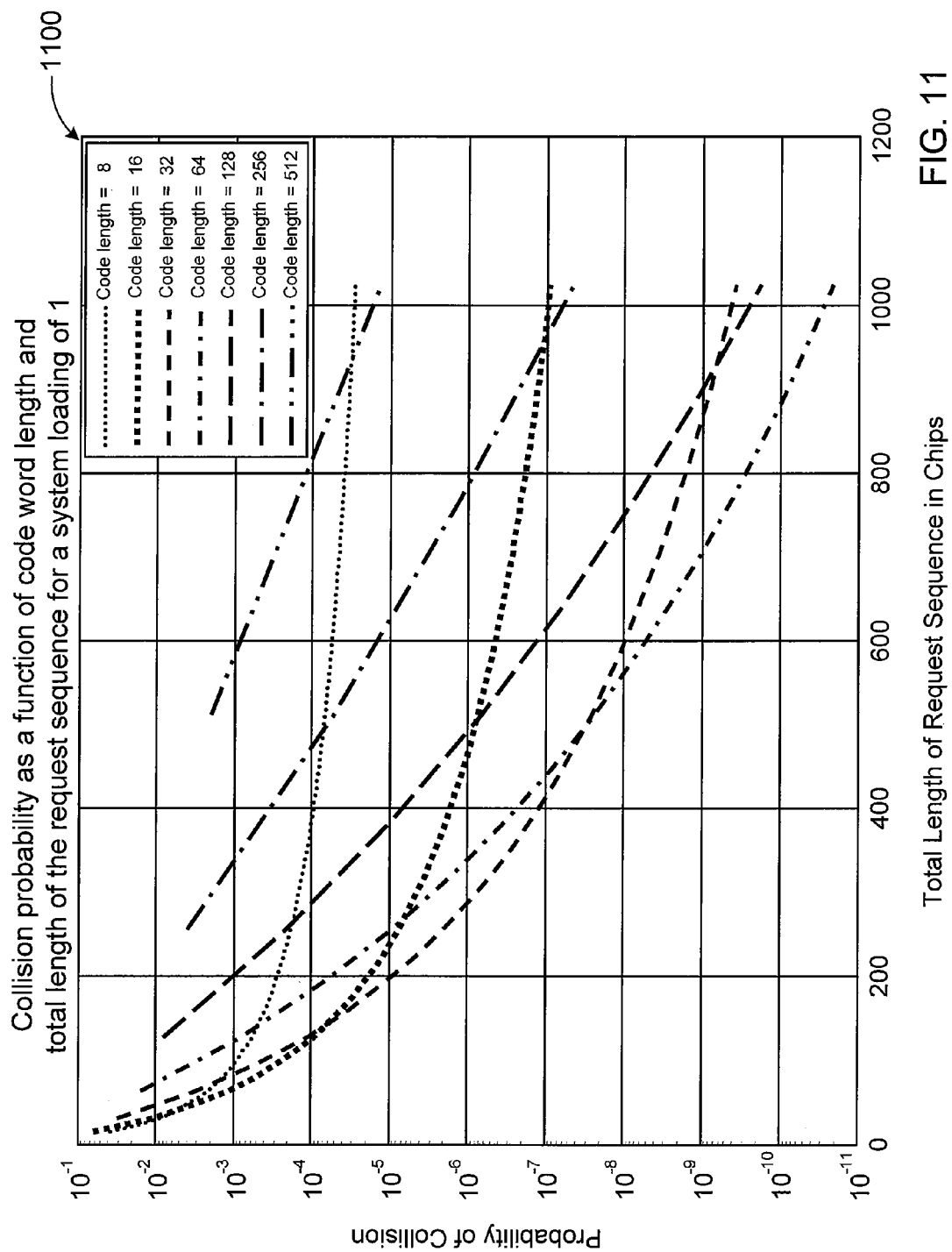
FIG. 11 is a plot of collision probability as a function of code word length and total length of the request sequence for a system loading of 1, according to an embodiment of the invention.

FIG. 11 is a plot 1100 of collision probability as a function of code word length and total length of the request sequence for a system loading of 1, according to an embodiment of the invention. A system loading of 1 means that one request is expected to occur in each frame. FIG. 11 shows that as the total length of the request sequence increases, the probability of collision decreases. However, FIG. 11 also shows that for a given request sequence length, the probability of collision is not necessarily reduced by utilizing more short code words compared to utilizing fewer long code words.

Figure 12:
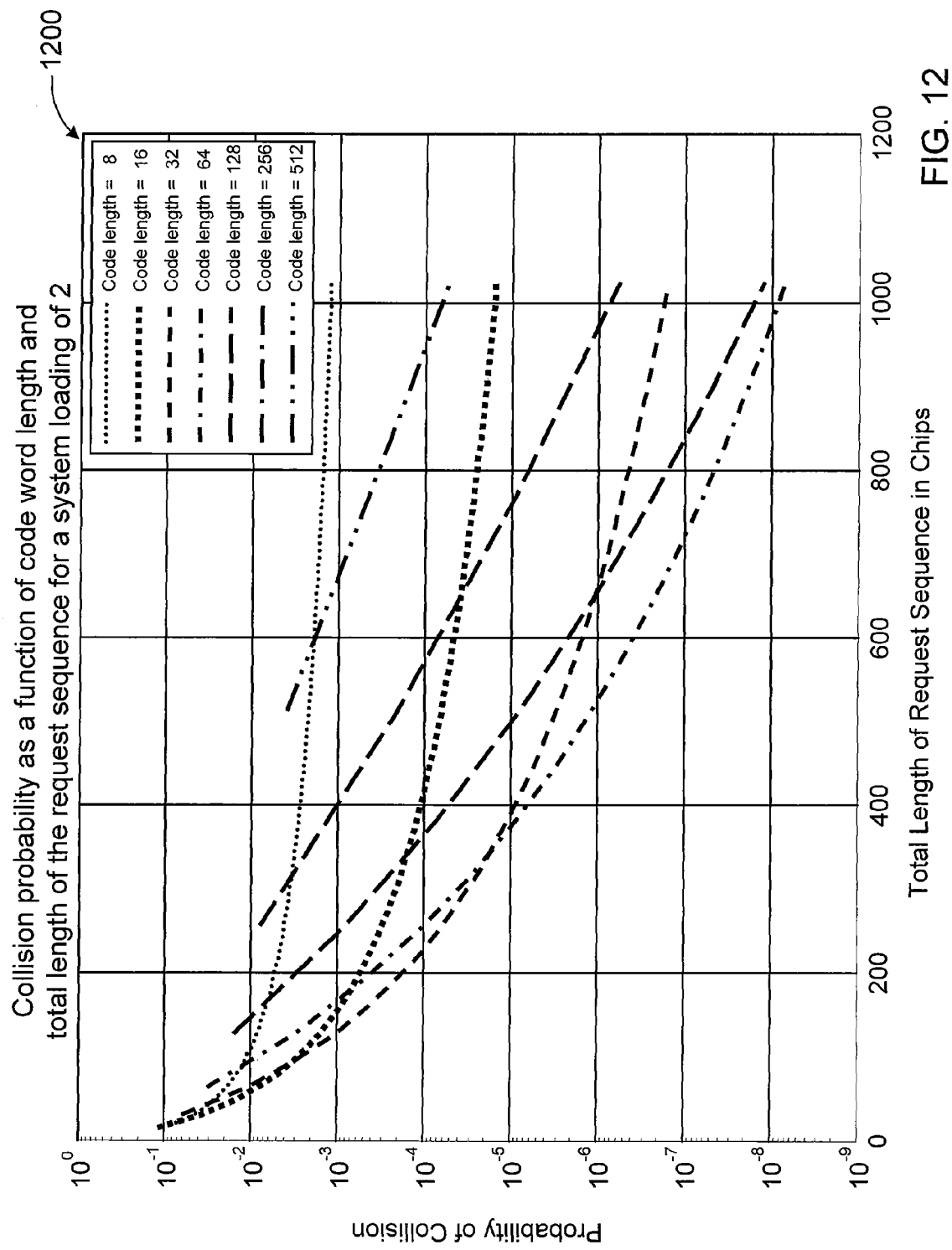
FIG. 12 is a plot of collision probability as a function of code word length and total length of the request sequence for a system loading of 2, according to an embodiment of the invention.

FIG. 12 is a plot 1200 of collision probability as a function of code word length and total length of the request sequence for a system loading of 2, according to an embodiment of the invention. A system loading of 2 means that two requests are expected to occur in each frame. FIG. 12 shows that as the total length of the request sequence increases, the probability of collision decreases. However, FIG. 12 also shows that for a given request sequence length, the probability of collision is not necessarily reduced by utilizing more short code words compared to utilizing fewer long code words.

Figure 13:
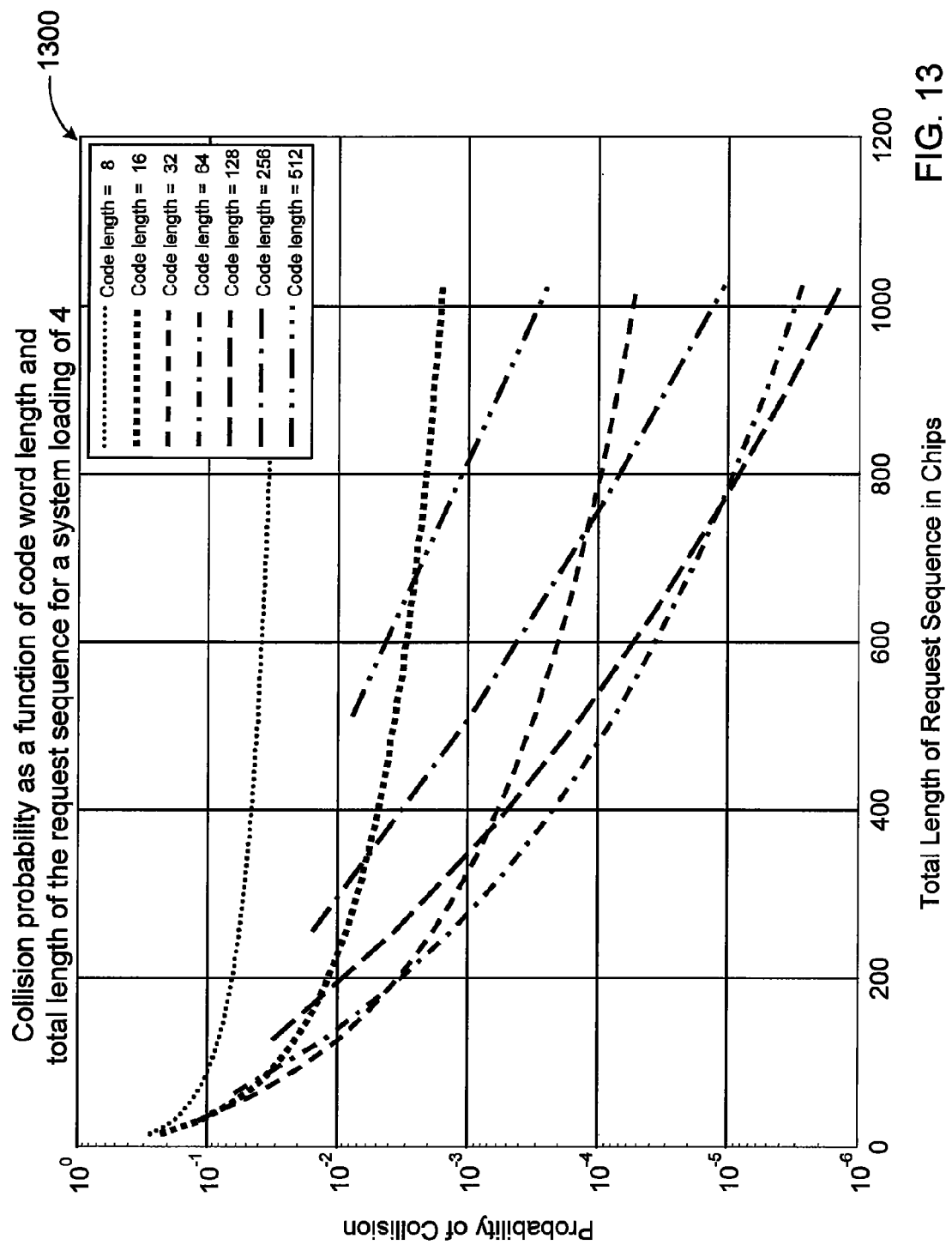
FIG. 13 is a plot of collision probability as a function of code word length and total length of the request sequence for a system loading of 4, according to an embodiment of the invention.

FIG. 13 is a plot 1300 of collision probability as a function of code word length and total length of the request sequence for a system loading of 4, according to an embodiment of the invention. A system loading of 4 means that fours requests are expected to occur in each frame. FIG. 13 shows that as the total length of the request sequence increases, the probability of collision decreases. However, FIG. 13 also shows that for a given request sequence length, the probability of collision is not necessarily reduced by utilizing more short code words compared to utilizing fewer long code words.

Figure 14:
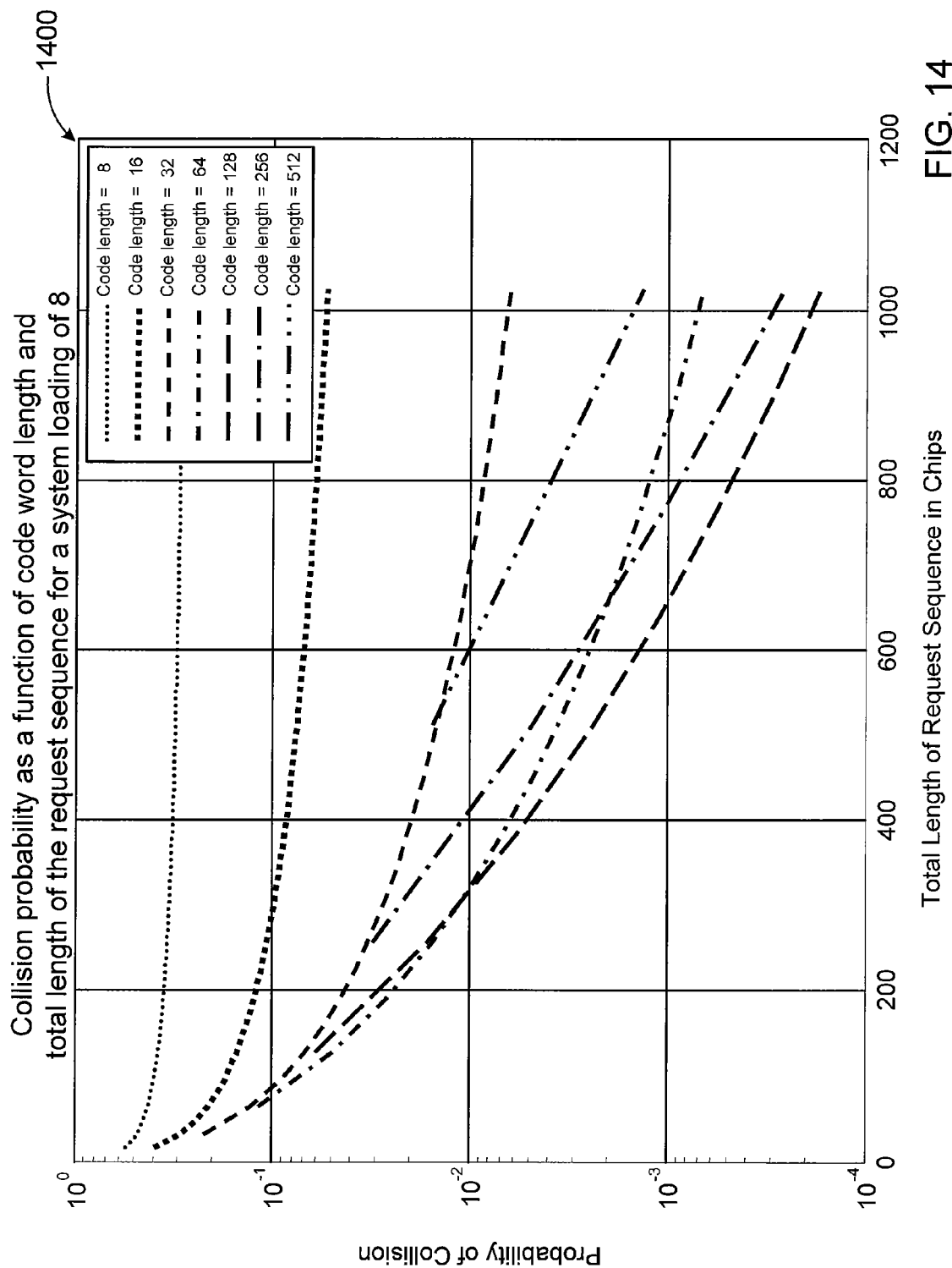
FIG. 14 is a plot of collision probability as a function of code word length and total length of the request sequence for a system loading of 8, according to an embodiment of the invention.

FIG. 14 is a plot 1400 of collision probability as a function of code word length and total length of the request sequence for a system loading of 8, according to an embodiment of the invention. A system loading of 8 means that eight requests are expected to occur in each frame. FIG. 14 shows that as the total length of the request sequence increases, the probability of collision decreases. However, FIG. 14 also shows that for a given request sequence length, the probability of collision is not necessarily reduced by utilizing more short code words compared to utilizing fewer long code words.

FIGS. 10-14 show that requests containing multiple request intervals have a lower probability of collision than requests containing a single request interval. The requests containing a single request interval are shown in each plot as the first data point on the upper-left of each line (where code length is equal to request sequence length). In the following tables, data on collision performance from the preceding plots is presented. The data is organized based on an efficiency metric of request chips per unit loading. The metric is obtained by dividing the length of the request sequence in chips by the system loading. In each table, N is the length of the request sequence, $\lambda$ is the system loading, L is the code word length, and P is the number of request intervals.

Table 1 shows collision performance at a fixed value of 64 chips per unit loading, according to an embodiment of the invention. This table shows the minimum probability of collision from each of the plots in FIGS. 10-14 at the fixed value of 64 chips per unit loading. As shown in Table 1, the minimum probability of collision for a fixed value of 64 chips per unit loading occurs at a request sequence length of N=128.

TABLE 1

| N | $\lambda$ | L | P | $P_{Collision}$ |
|---|---|---|---|---|
| 32 | 0.5 | 8 | 4 | 1.84e−3 |
| 64 | 1 | 16 | 4 | 1.16e−3 |
| 128 | 2 | 32 | 4 | 1.03e−3 |
| 256 | 4 | 64 | 4 | 1.32e−3 |
| 512 | 8 | 128 | 4 | 2.38e−3 |

Table 2 shows collision performance at a fixed value of 96 chips per unit loading, according to an embodiment of the invention. This table shows the minimum probability of collision from each of the plots in FIGS. 10-14 at the fixed value of 96 chips per unit loading. As shown in Table 2, the minimum probability of collision for a fixed value of 96 chips per unit loading occurs at a request sequence length of N=192.

TABLE 2

| N | $\lambda$ | L | P | $P_{Collision}$ |
|---|---|---|---|---|
| 48 | 0.5 | 8 | 6 | 5.48e−4 |
| 96 | 1 | 16 | 6 | 2.68e−4 |
| 192 | 2 | 32 | 6 | 2.06e−4 |
| 384 | 4 | 64 | 6 | 2.61e−4 |
| 768 | 8 | 128 | 6 | 5.52e−4 |

Table 3 shows collision performance at a fixed value of 128 chips per unit loading, according to an embodiment of the invention. This table shows the minimum probability of collision from each of the plots in FIGS. 10-14 at the fixed value of 128 chips per unit loading. As shown in Table 3, the minimum probability of collision for a fixed value of 128 chips per unit loading occurs at a request sequence length of N=256.

TABLE 3

| N | $\lambda$ | L | P | $P_{Collision}$ |
|---|---|---|---|---|
| 64 | 0.5 | 16 | 4 | 1.86e−4 |
| 128 | 1 | 16 | 8 | 9.30e−5 |
| 256 | 2 | 32 | 8 | 6.14e−5 |
| 512 | 4 | 64 | 8 | 7.41e−5 |
| 1024 | 8 | 128 | 8 | 1.69e−4 |

Table 4 shows collision performance at a fixed value of 256 chips per unit loading, according to an embodiment of the invention. This table shows the minimum probability of collision from each of the plots in FIGS. 10-14 at the fixed value of 256 chips per unit loading. As shown in Table 4, the minimum probability of collision for a fixed value of 256 chips per unit loading occurs at a request sequence length of N=512.

TABLE 4

| N | λ | L | P | $P_{Collision}$ |
|---|---|---|---|---|
| 128 | 0.5 | 16 | 8 | 5.93e−6 |
| 256 | 1 | 32 | 8 | 2.00e−6 |
| 512 | 2 | 64 | 8 | 1.18e−6 |
| 1024 | 4 | 128 | 8 | 1.39e−6 |

The data presented in the preceding tables shows that there is a relationship between request sequence length, the number of code words in a request sequence, and system loading. In each table, the minimum probability of collision occurs at a request sequence length of twice the fixed value of chips per unit loading. This data can be used to select the optimum request sequence length based on expected system loading and required collision probability.

While the present invention has been described in terms of specific embodiments, it should be apparent to those skilled in the art that the scope of the present invention is not limited to the described specific embodiments. The specification and drawings are, accordingly, to be regarded in an illustrative rather than a restrictive sense. It will, however, be evident that additions, subtractions, substitutions, and other modifications may be made without departing from the broader spirit and scope of the invention as set forth in the claims.

What is claimed is:

1. A method for communicating using a shared communication medium comprising:

sending a request from a first node in a plurality of nodes over the shared communication medium, the shared communication medium organized to include a plurality of frames each having a request signal space organized based on code division multiplexing and a scheduled transmission signal space, the request signal space of each frame including a plurality of request intervals each having a plurality of request segments, each of the plurality of request segments having a different location within the request signal space, the scheduled transmission signal space of each frame including a plurality of scheduled transmission segments each having a different location within the scheduled transmission signal space, the request sent in a first frame and occupying two or more request segments, each of the two or more request segments selected from a different one of the plurality of request intervals within the first frame, wherein each of the two or more request segments are randomly selected by the first node by selecting a code word;

receiving an assignment for assigning the request to a transmission opportunity in the scheduled transmission signal space of a second frame, the assignment made in response to detecting at least one of the two or more request segments; and from the first node, sending a data transmission using the assigned transmission opportunity in the scheduled transmission signal space of the second frame.

2. The method of claim 1 wherein the plurality of request intervals are organized based on an expected loading of the shared communication medium.

3. The method of claim 1 wherein the plurality of request intervals and the plurality of request segments are organized based on a collision probability of the request.

4. A method for communicating using a shared communication medium involving a plurality of nodes including a first node and a second node, the method comprising:

at the second node, receiving a request from the first node over the shared communication medium, the shared communication medium organized to include a plurality of frames each having a request signal space organized based on code division multiplexing and a scheduled transmission signal space, the request signal space of each frame including a plurality of request intervals each having a plurality of request segments, each of the plurality of request segments having a different location within the request signal space, the scheduled transmission signal space of each frame including a plurality of scheduled transmission segments each having a different location within the scheduled transmission signal space, the request sent in a first frame and occupying two or more request segments, each of the two or more request segments selected from a different one of the plurality of request intervals within the first frame, wherein each of the two or more request segments are randomly selected by the first node by selecting a code word;

at the second node, sending an assignment for assigning the request to a transmission opportunity in the scheduled transmission signal space of a second frame, the assignment made in response to detecting at least one of the two or more request segments; and at the second node, receiving a data transmission using the assigned transmission opportunity in the scheduled transmission signal space of the second frame.

5. The method of claim 4 wherein the plurality of request intervals are organized based on an expected loading of the shared communication medium.

6. The method of claim 4 wherein the plurality of request intervals and the plurality of request segments are organized based on a collision probability of the request.

7. An apparatus for communicating using a shared communication medium comprising:

a first node configured to send a request over the shared communication medium, the shared communication medium organized to include a plurality of frames each having a request signal space organized based on code division multiplexing and a scheduled transmission signal space, the request signal space of each frame including a plurality of request intervals each having a plurality of request segments, each of the plurality of request segments having a different location within the request signal space, the scheduled transmission signal space of each frame including a plurality of scheduled transmission segments each having a different location within the scheduled transmission signal space, the request sent in a first frame and occupying two or more request segments, each of the two or more request segments selected from a different one of the plurality of request intervals within the first frame, wherein each of the two or more request segments are randomly selected by the first node by selecting a code word;

wherein the first node is configured to receive an assignment for assigning the request to a transmission opportunity in the scheduled transmission signal space of a second frame, the assignment made in response to detecting at least one of the two or more request segments; and wherein the first node is configured to send a data transmission using the assigned transmission opportunity in the scheduled transmission signal space of the second frame.

8. The apparatus claim 7 wherein the plurality of request intervals are organized based on an expected loading of the shared communication medium.

9. The apparatus of claim 7 wherein the plurality of request intervals and the plurality of request segments are organized based on a collision probability of the request.

10. An apparatus for communicating using a shared communication medium comprising:
- a second node configured to receive a request from a first node over the shared communication medium, the shared communication medium organized to include a plurality of frames each having a request signal space organized based on code division multiplexing and a scheduled transmission signal space, the request signal space of each frame including a plurality of request intervals each having a plurality of request segments, each of the plurality of request segments having a different location within the request signal space, the scheduled transmission signal space of each frame including a plurality of scheduled transmission segments each having a different location within the scheduled transmission signal space, the request sent in a first frame and occupying two or more request segments, each of the two or more request segments selected from a different one of the plurality of request intervals within the first frame, wherein each of the two or more request segments are randomly selected by the first node by selecting a code word;
- wherein the second node is configured to send an assignment for assigning the request to a transmission opportunity in the scheduled transmission signal space of a second frame, the assignment made in response to detecting at least one of the two or more request segments; and
- wherein the second node is configured to receive a data transmission using the assigned transmission opportunity in the scheduled transmission signal space of the second frame.

11. The apparatus of claim 10 wherein the plurality of request intervals are organized based on an expected loading of the shared communication medium.

12. The apparatus of claim 10 wherein the plurality of request intervals and the plurality of request segments are organized based on a collision probability of the request.

\* \* \* \* \*